(12) United States Patent
Huebra

(10) Patent No.: US 10,303,441 B2
(45) Date of Patent: May 28, 2019

(54) PROCESS AND SYSTEM FOR AUTOMATIC GENERATION OF FUNCTIONAL ARCHITECTURE DOCUMENTS AND SOFTWARE DESIGN AND ANALYSIS SPECIFICATION DOCUMENTS FROM NATURAL LANGUAGE

(71) Applicant: Nadia Analía Huebra, Buenos Aires (AR)

(72) Inventor: Nadia Analía Huebra, Buenos Aires (AR)

( * ) Notice: Subject to any disclaimer, the term of this patent is extended or adjusted under 35 U.S.C. 154(b) by 0 days.

(21) Appl. No.: 15/141,748

(22) Filed: Apr. 28, 2016

(65) Prior Publication Data

US 2017/0003937 A1 Jan. 5, 2017

Related U.S. Application Data

(60) Provisional application No. 62/154,093, filed on Apr. 28, 2015.

(51) Int. Cl.
| | |
|---|---|
| *G06F 9/44* | (2018.01) |
| *G06F 8/20* | (2018.01) |
| *G06F 8/73* | (2018.01) |
| *G06F 17/27* | (2006.01) |

(52) U.S. Cl.
CPC ............ *G06F 8/20* (2013.01); *G06F 8/73* (2013.01); *G06F 17/271* (2013.01); *G06F 17/2755* (2013.01)

(58) Field of Classification Search
CPC ....................................................... G06F 8/10
See application file for complete search history.

(56) References Cited

U.S. PATENT DOCUMENTS

| | | | |
|---|---|---|---|
| 7,409,337 B1* | 8/2008 | Potter | G06F 17/2735 704/9 |
| 7,555,742 B2 | 6/2009 | Iborra et al. | |
| 8,561,014 B2 | 10/2013 | Mengusoglu et al. | |
| 2013/0097583 A1* | 4/2013 | Kung | G06F 8/10 717/105 |
| 2017/0068519 A1 | 3/2017 | Huebra | |

FOREIGN PATENT DOCUMENTS

WO 2008131028 A2 10/2008

* cited by examiner

*Primary Examiner* — Hang Pan
(74) *Attorney, Agent, or Firm* — The Morales Law Firm, LLC; Joseph L. Morales

(57) ABSTRACT

The present invention is a computer-implemented system and method for automatic generation of Functional Architecture, business, analysis and software design documents based on phrases expressed in natural language.

Eligible languages and their syntactic and grammatical features can be entered into the system. The system receives the description of the case in natural language, in one of the eligible languages, through an input/output device. The processor automatically analyzes the description, automatically extracts the functional components from its morphosyntactic structure and automatically generates functional architecture documents for use in industry. Based on the functional components of the text, the processor automatically generates design components in order to produce business, analysis, and software design specification documents.

19 Claims, 13 Drawing Sheets

Figure 1:
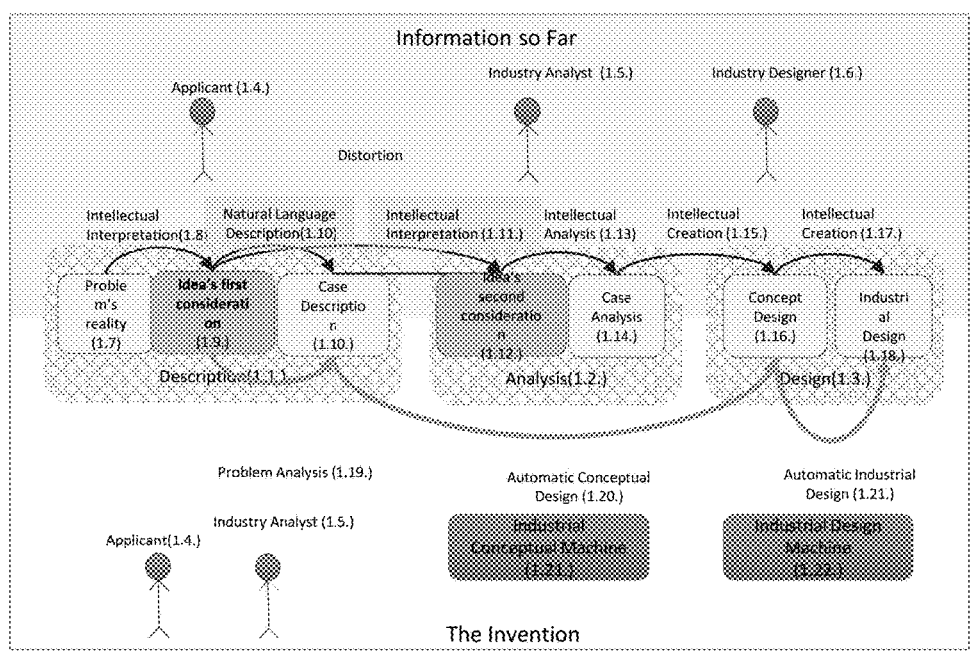
Figure 2:
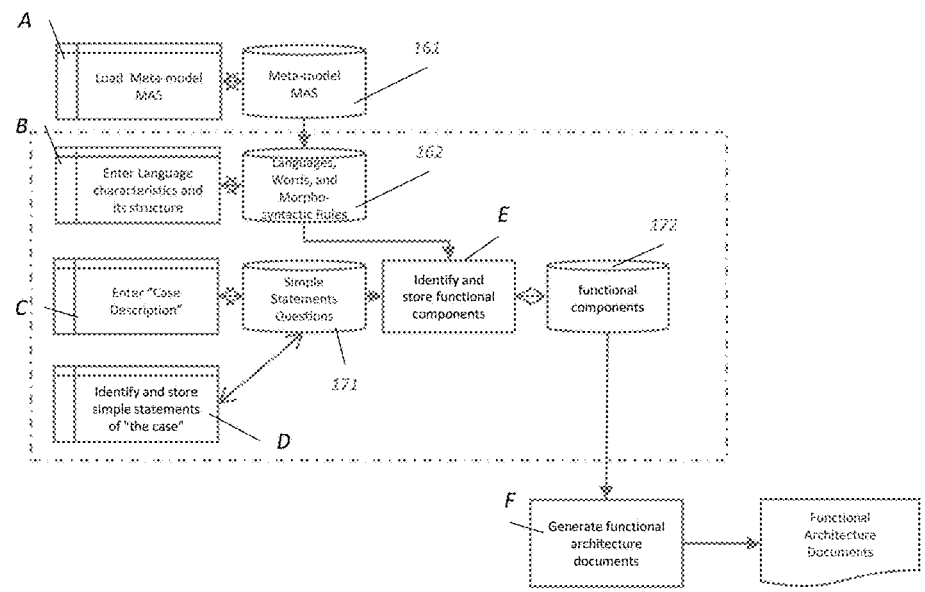
Figure 4:
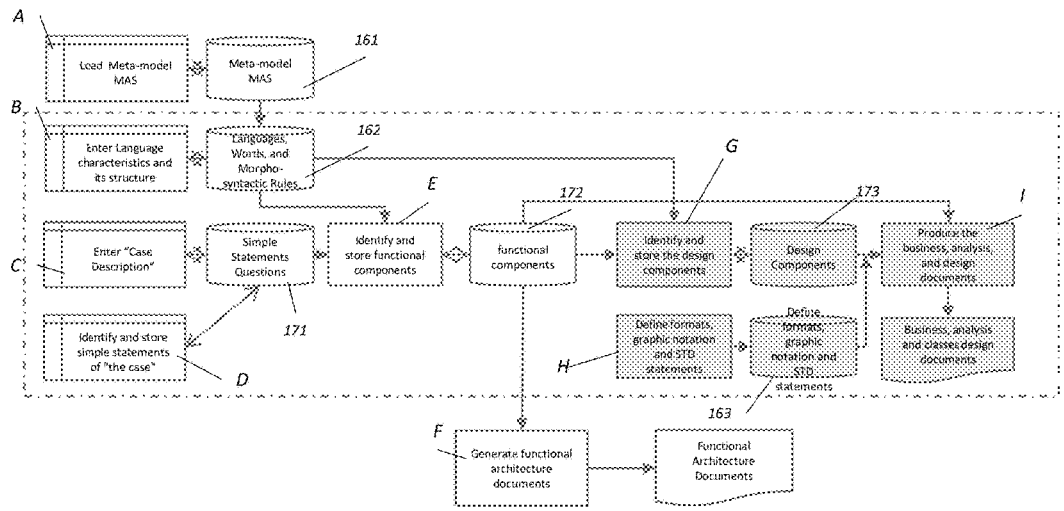
Figure 4A:
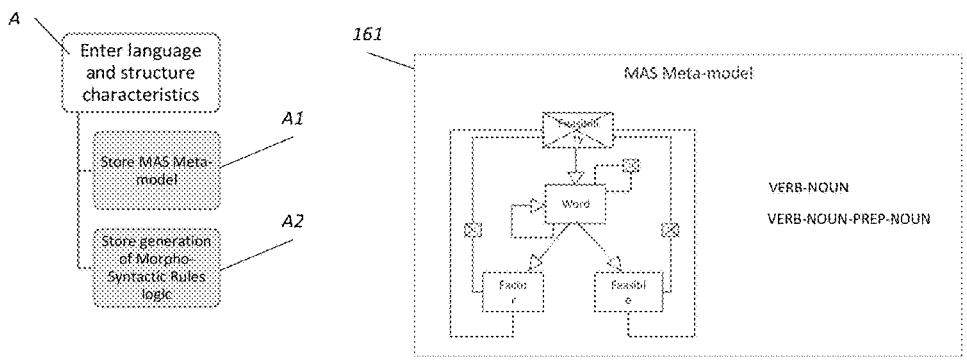

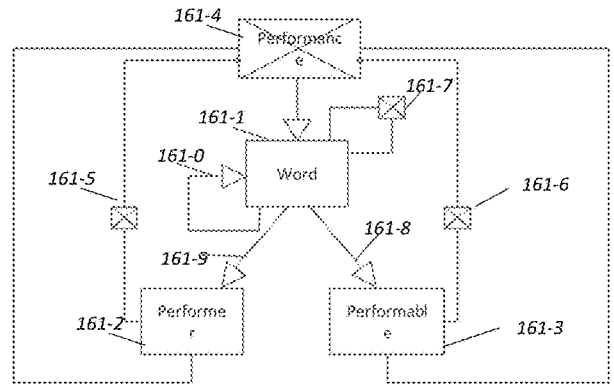
FIG. 4A1
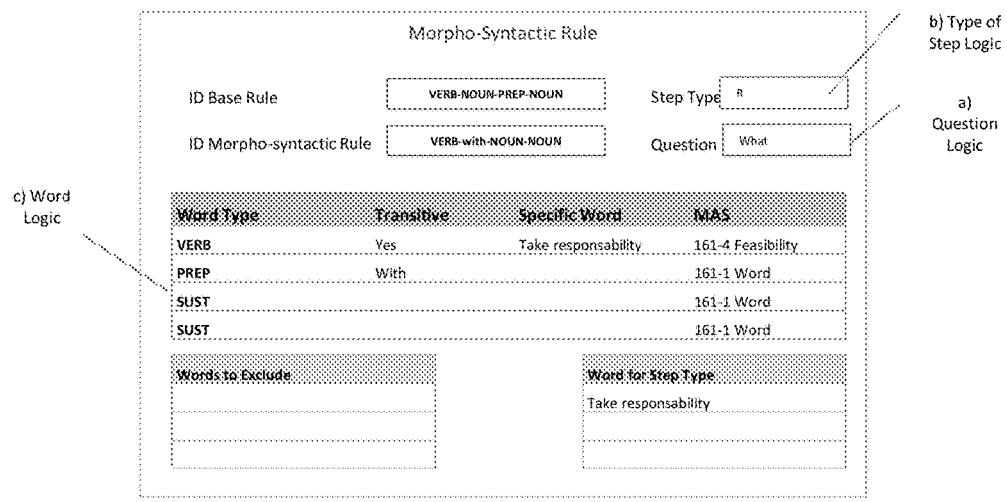
FIG. 4A2

FIG. 4A3

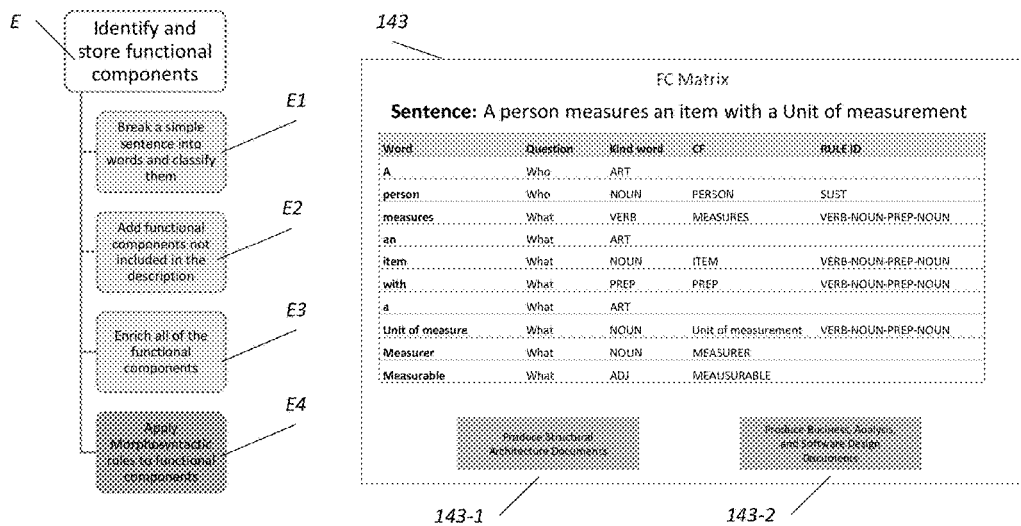
FIG. 4E
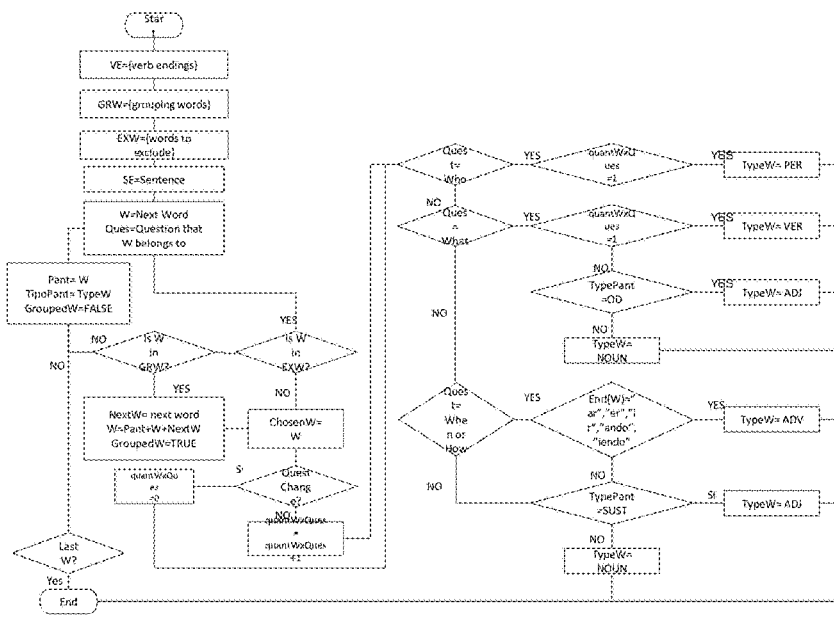
FIG. 4E1

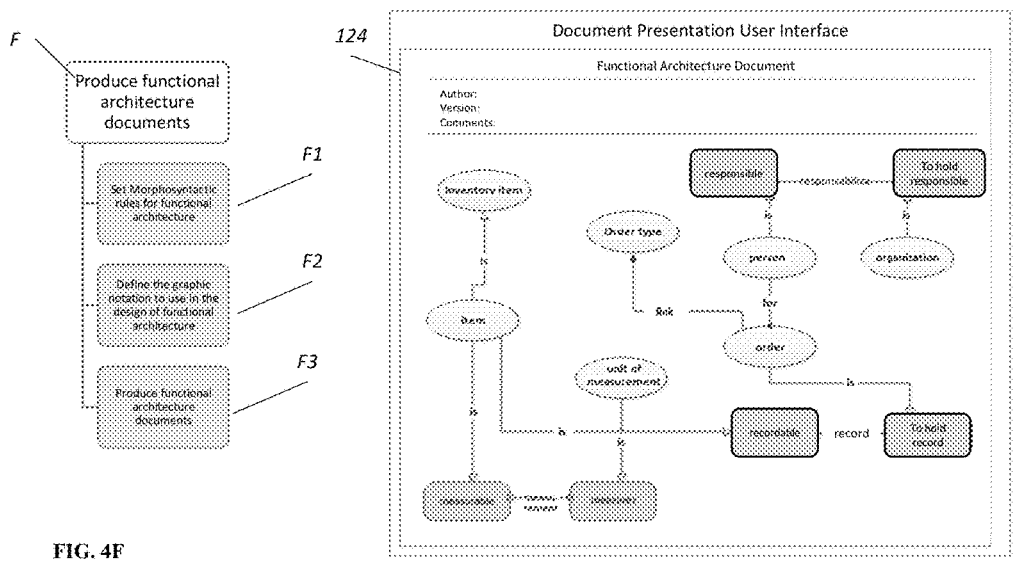
FIG. 4F
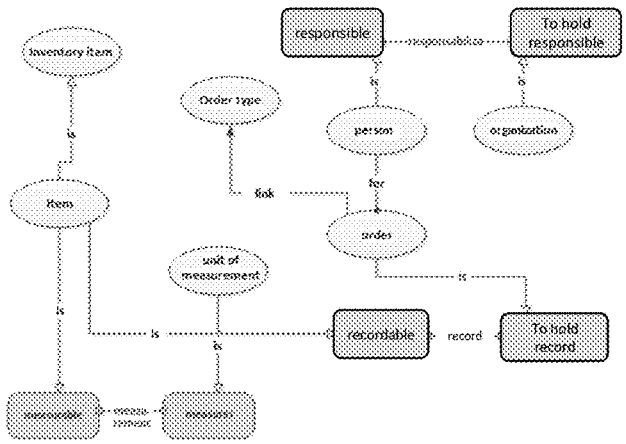
FIG. 4F1

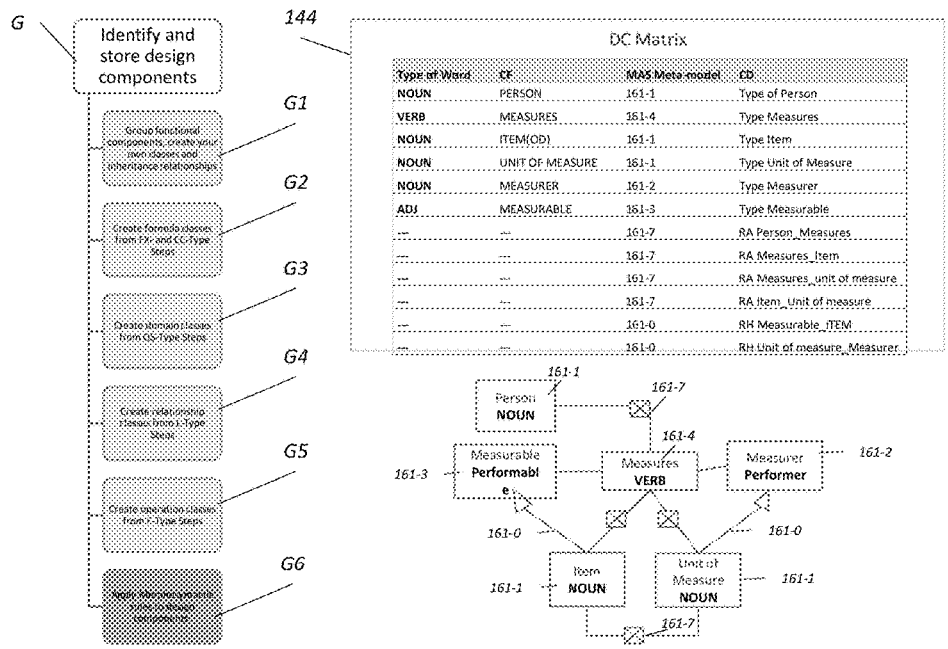
FIG. 4G
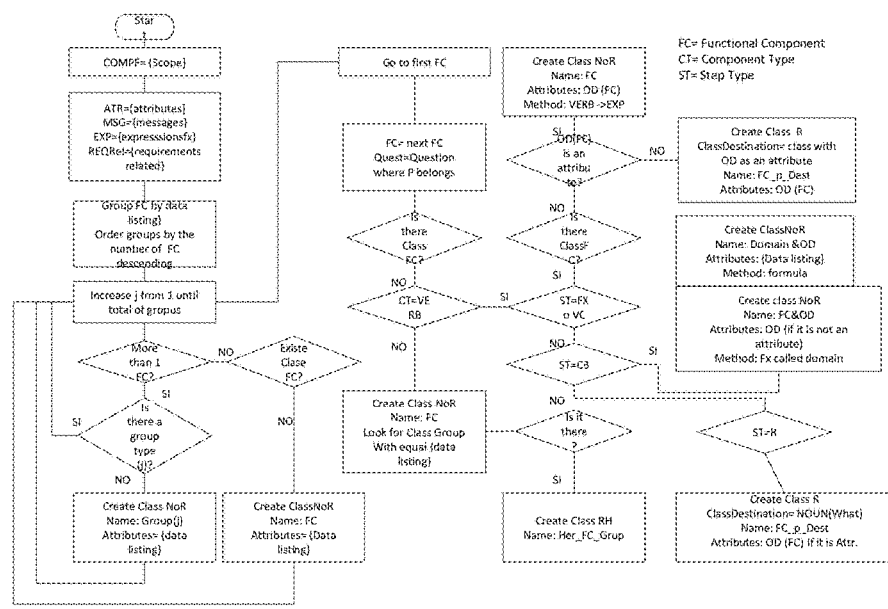
FIG. 4G1

Figure 4B:
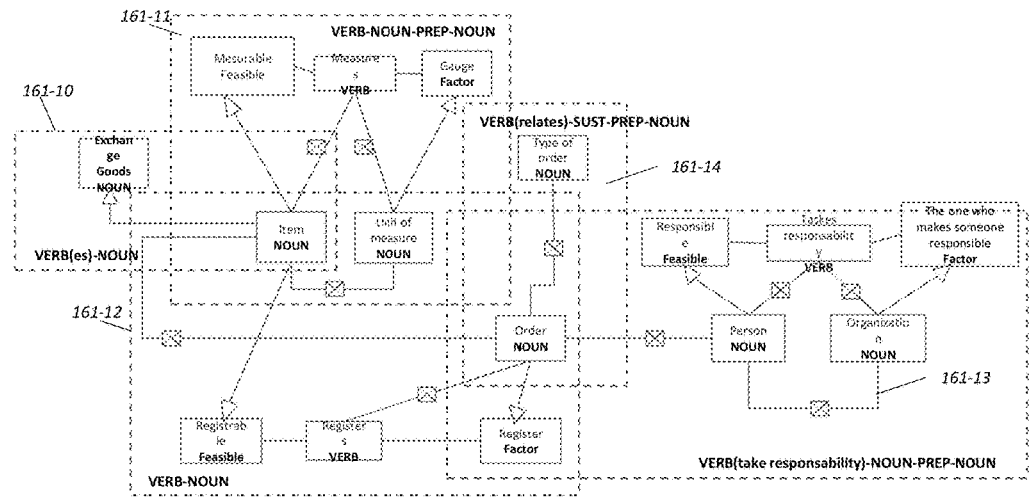
Figure 4B:
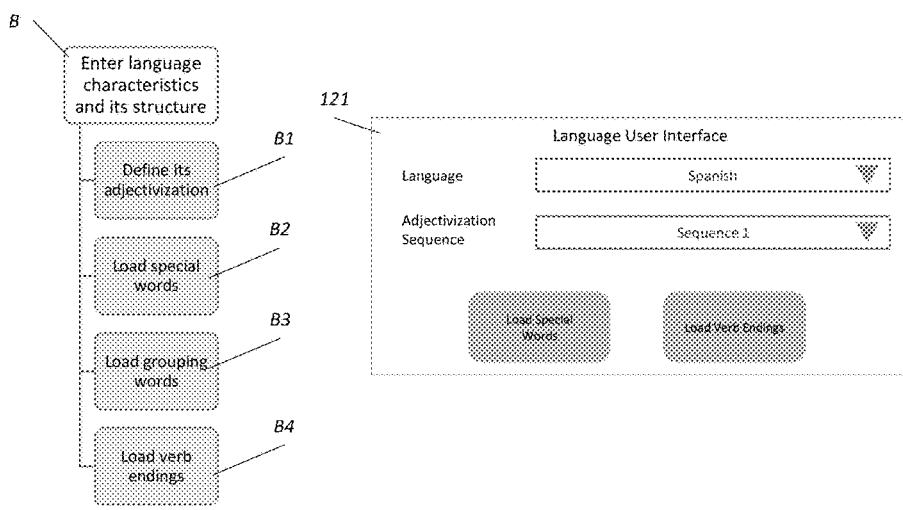
Figure 4C:
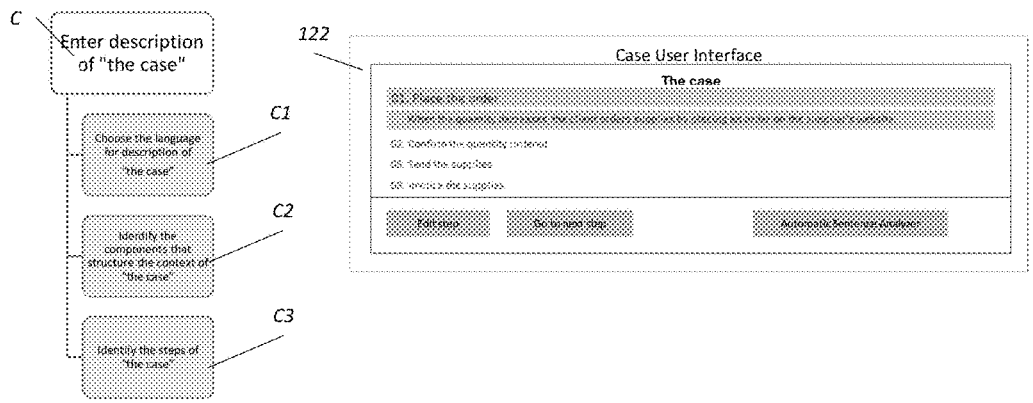
Figure 4D:
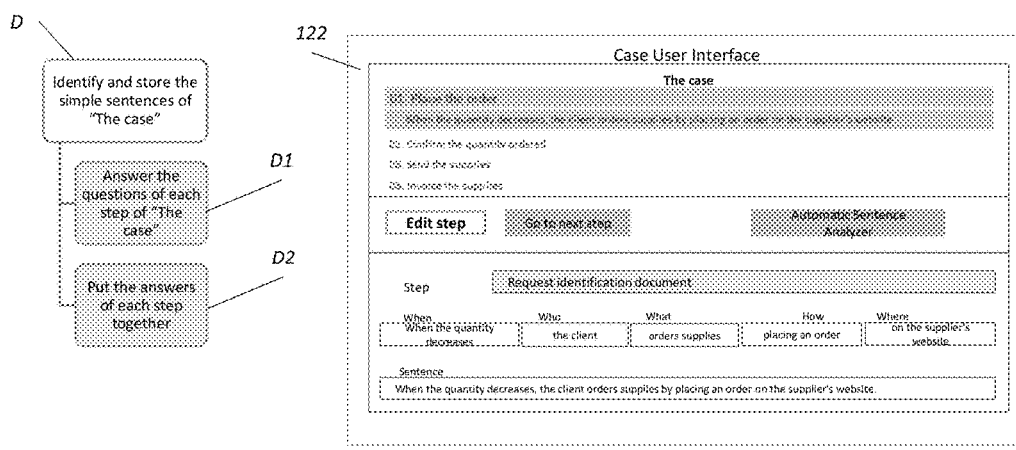
Figure 4H:
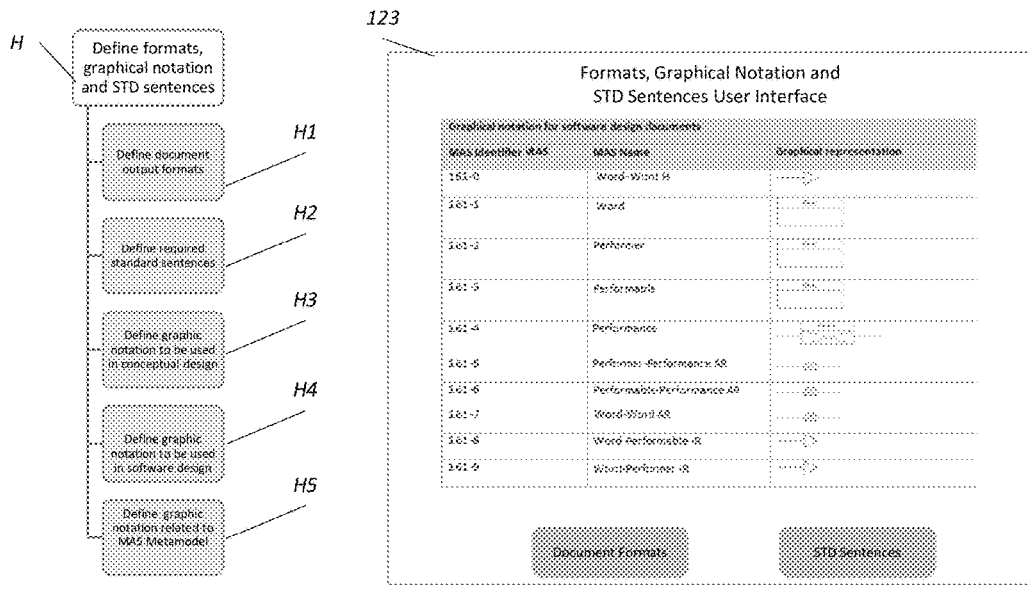
Figure 4I:
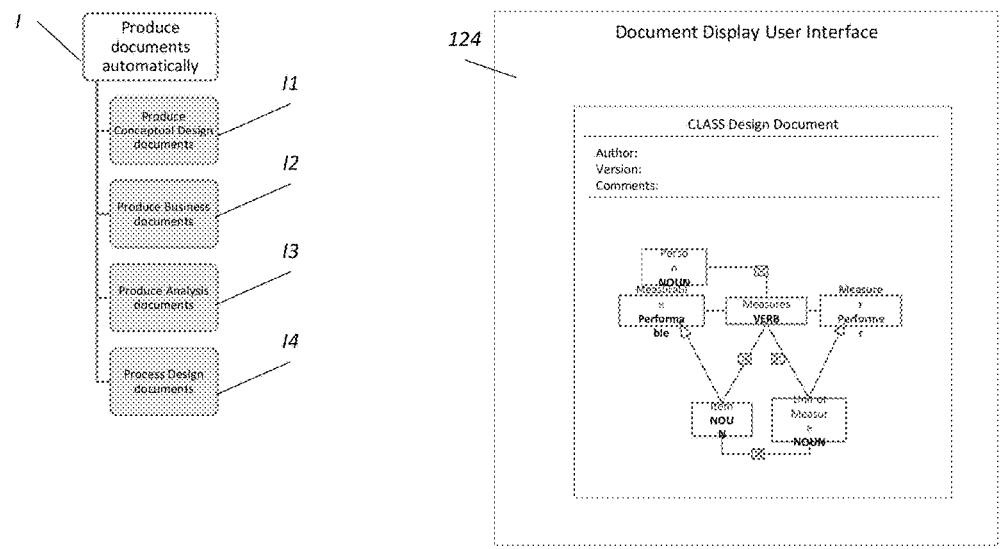

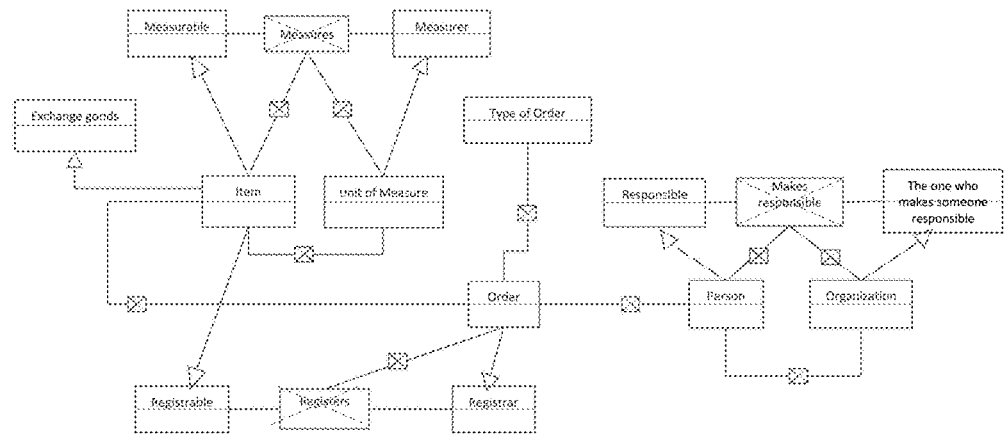
FIG. 4I1
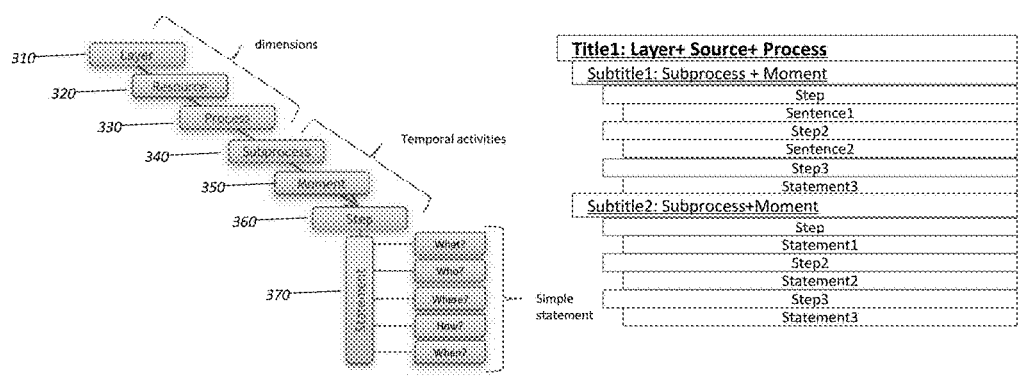
FIG. 4I2

FIG. 4I3

| Type of word | Graphical element | ID | Description |
|---|---|---|---|
| NOUN | (ellipse) | FNOUN | Represents words of the noun type |
| VERB ER-BLE, created by the processor | (rounded rectangle) | FERBLE | Represents the words generated by a transitive verb, such as ER and BLE |
| VERB "to be" | ·······◇· | FTOBE | Represents the verb "to be" |
| PREP | ·········· | FPREP | Represents prepositions |
| Any other type of VERB | ——▶ | FVERB | Represent the remaining verbs |
| Performance VERB, created by the processor | ········◇ | FPERF | Represents the relationship between the ER and the BLE |

FIG. 6

| Graphical notation for software design documents | | |
|---|---|---|
| MAS Identifier | MAS Name | Graphical representation |
| 161-0 | Word-Word I | ——▷ |
| 161-1 | Word | (box) |
| 161-2 | Performer | (box) |
| 161-3 | Performable | (box) |
| 161-4 | Performance | (symbol) |
| 161-5 | Performer-Performance AR | ····⊗···· |
| 161-6 | Performable-Performance AR | ····⊗···· |
| 161-7 | Word-Word AR | ····⊗···· |
| 161-8 | Word-Performable IR | ——▷ |
| 161-9 | Word-Performer IR | ——▷ |

FIG. 7

PROCESS AND SYSTEM FOR AUTOMATIC GENERATION OF FUNCTIONAL ARCHITECTURE DOCUMENTS AND SOFTWARE DESIGN AND ANALYSIS SPECIFICATION DOCUMENTS FROM NATURAL LANGUAGE

1. CROSS-REFERENCE TO RELATED APPLICATIONS

This application claims the benefits of the filing date of provisional patent application U.S. No. 62/154,093 titled "Proceso para generar documentos de especificación de análisis y de diseno" (Process for generating analysis and design specification documents), which was filed 28 Apr. 2015, by the same inventor of this application. The aforementioned provisional application is incorporated herein as reference, as if it were divulged in the present document.

2. FIELD OF THE INVENTION

The present invention relates in general to the process of modeling reasoning by means of a formal logic analogous to the abstract thought with which human beings process natural language. It specifically relates to deriving process models from case specifications based on natural language.

3. PRIOR ART

The prior art discloses devices for automatic generation of software design documents from requirements expressed in phrases that are stored in knowledge bases, based on which they model 'Classes' (in the context of Object-Oriented Programming) that are subsequently visualized as UML diagrams. It also discloses systems and methods for formalizing natural language in such a way that the resulting language can be processed by a computer.

U.S. 2013/0097583 discloses a system and method that provides an automation support tool to guide/help software engineers in creating software products. The system includes input/output, storage, processing and communication devices. The system aids software engineers in identifying and graphically representing the use cases derived from the requirements, actors or entities, systems and subsystems by means of one or more phrases that describe the requirements and the actors or entities involved, as well as generating a domain model and a UML class diagram to visualize the domain model. The system also allows for creation of expanded use cases, creation of an object interaction model, creation of sequence diagrams, and creation of a design class diagram. Based on the design class diagram, software engineers can produce high-quality computer programs. The system may include or may connect to a diagram generator in order to automatically generate UML (Unified Modeling Language) class diagrams. Unlike the present invention, the inputs of said patent are software requirements written in natural language. Our invention consists of natural language sentences that describe the business "case". The input of said patent is one of the specific cases that our invention can solve. The parser (word recognition technique) is traditional; it is based on a dictionary. The parser in our invention is automatic and based on rules that do not employ a dictionary. The present invention increases accuracy in a much shorter processing time. U.S. 2013/0097583, in order to achieve complete software design, requires the involvement of a software engineer to design and develop code, supported by the diagrams generated by the invention of the patent. In the present invention, the resulting design is complete and automatic, comprising 100% of the design stated in the descriptive text. The abstraction of the conceptual domain model in the present invention is formal. That is, the design always responds to the same rules and thus, produces predictable results. In U.S. 2013/0097583, the conceptual model is 20% handmade and case dependent.

U.S. 2011/0239183 discloses a method in which one or more process models are derived from natural language use case models. For example, use of a processor and access to a memory-stored use case model, obtained from natural language text information described using a limited list of predefined words with preassigned meaning, can thereby transform the memory-stored model into a process model according to a predetermined modeling notation. In the present invention, the design is carried out at a functional Architecture Document level, based on unlimited natural language, from which the different types of software design diagrams can be obtained.

Every industry faces the challenge of improving its construction process, the main error factor thereof being the difference between the requester's description ("the case") and what the industry produces (the solution).

Currently, someone who wants to describe "the case" in order to construct a solution based on said description needs:

An industry analyst to interpret and document. This documentation is performed by the analyst taking notes about the requester's comments regarding "the case". The analyst then analyzes the documentation and creates some diagrams by applying one of the industry's well-known techniques. When the documents have been sufficiently reviewed, they are submitted to the "case" design stage. The content of these diagrams depends exclusively on the expert's interpretation and his ability to translate into the aforementioned diagrams specific to each industry.

An industry designer to design the desired solution based on the analysis and the aforementioned documentation about the described "case". The designer obtains the analysis diagrams and meets with the analyst to seek an explanation that allows him to maximize his correct understanding of the diagrams, based on which he can then design a solution for "the case". This design is carried out by creating other diagrams, also industry dependent. These diagrams represent new translations of the logic described by the requester into the technical language necessary to build the solution for "the case".

Both the analyst and the designer are professionals that have been trained with the goal of understanding the description of the case and translating it into technical analysis and design languages that can then be interpreted by those who build the solution. That is to say that several languages are used from the description of "the case" until the beginning of the construction of the related solution (see FIG. 4 The industrial design process):

A. The language that describes "the case" (intervening role: the requester, who poses the requirements): natural language.

B. The analysis language of "the case" (intervening role: the industry analyst, who interprets the request and translates it into analysis diagrams): figures that use standard industry notation, handmade drafts, with complementary descriptions expressed in natural language with a design-oriented focus.

C. The design language of "the case" (intervening role: the designer, the architect who interprets the analyst's work and translates it into design diagrams): architectural figures, plans, and diagrams specific to the industry of use, which represent the design of the solution.

The person who requires that a certain solution be designed (the requester) is usually not an expert designer of the specific industry, and thus, would not be able to construct the solution on his own. He needs the industry analyst and the industry designer to properly interpret his requirements and capture them in the solution design for "the case". It so happens that this is impossible in practice because the requester does not understand the design language (architect, civil engineer, book designer, software designer, among other applications), and thus does not have control over the resulting design in order to ensure that a solution for "the case" he described will be constructed. Herein lies the greatest share of the deviation from the description ("the case") and the actual construction (the solution), because there is normally a distortion in the conception of the meaning due to the change in languages, as shown in FIG. 1. As a consequence, the requester receives a design and a resulting product (a house, a piece of software, a piece of furniture, a book, etc) that are not perfectly adjusted to his needs.

The industry is constantly making an effort to increase the degree of convergence between the solutions and the requesters' descriptions of their needs. These efforts are focused on improving current methods, by training experts or improving the tools used in their work, without replacing their participation in the handcrafted process of interpreting and structuring the aforementioned descriptions.

This approach to handling the technical problem necessarily produces multiple interpretations of the requirements, because the translation of the language used by the requester (natural language) into the language used by the analysts and designers (technical languages) entails a transformation resulting in a loss of knowledge, which nobody can control precisely.

In the present invention, in order to completely describe "the case", it is enough to use sentences structured in natural language. It is not necessary to translate the aforementioned sentences by hand into diagrams with technical graphical notation to enable comprehension and transmission of the knowledge contained in the description. These diagrams are generated automatically from natural language by the tool.

The differences between what currently exists and the invention are shown in the following table (FIG. 4 The industrial design process)

|  |  | What currently exists |  | The invention |  |
| --- | --- | --- | --- | --- | --- |
| Stage | Substage | Language | Method | Language | Method |
| Description (1.1) | Intellectual Interpretation (1.8) | Natural Language Semantics | Requester's interpretation of the reality of the problem. | Natural Language | Requester's interpretation and analysis of the reality of the problem. |
|  | Description in Natural Language (1.10) | Natural Language Grammar and Syntax | Requester's formulation and/or description of the problem. | Natural Language | Industry analyst's formulation and/or description of the problem. |
| Analysis (1.2) | Intellectual Interpretation (1.11) | Natural language Semantics | Industry analyst's interpretation of the analysis of the problem, based on the previous description. |  |  |
|  | Intellectual Analysis (1.13) | Semantics and Semiotics of Industrial Language based on the industry's analysis standards. | Industry analyst's analysis and graphical and/or textual representation of the result. | Stage solved automatically by the machine. |  |
| Design (1.3) | Intellectual Creation of the conceptual design (1.15.) | Semantics of Natural Language and semiotics of the conceptual design. | Industry designer's creation of a conceptual design. This design represents the meaning of the analysis. | Natural Language | Direct and automatic inference performed by the conceptual design machine (1.21.) based on the description in natural Language (1.10). |
|  | Intellectual Creation of the conceptual design (1.17.) | Semantics and Semiotics of Industrial Language based on the industry's design standards. | Industry designer's creation of an industrial design, based on the conceptual design, using the standard symbols | Natural Language | Direct and automatic inference performed by the industrial design machine (1.22.) based on the |

-continued

| | | What currently exists | | The invention | |
|---|---|---|---|---|---|
| Stage | Substage | Language | Method | Language | Method |
| | | | defined by the industry of use. | | description in natural Language (1.10). |

Given a description of the reality for which a specific industrial design is desired, based on what said description represents, the system structures the natural language descriptions, thereby guaranteeing the storage of the entirety of the linguistic components of "the case" in an interconnected and coherent way from a semantic perspective. It also automatically constructs Functional Architecture Documents that are useful in multiple industrial applications.

The present invention demonstrates the use of Functional Architecture Documents and their components to construct Software Design applications.

In the present invention, mentions of "the case" refer to a reality problem for which we want to build a software application that allows a computer to process its logic. Thus, the software industry of "the case" faces the challenge of improving software construction projects, the main error factor thereof being the difference between the requester's description (the problem) and what "the case" solves (the solution). Currently, someone who wants to describe "the case" based on which to build a software solution needs:

a systems analyst to interpret and document. This documentation is produced by the analyst taking gathering notes about the client's comments regarding the "the case". The analyst then analyzes the documentation and creates some diagrams by applying one of the industry's well-known techniques (UML diagrams, flow diagrams, process diagrams). When the documents have been sufficiently reviewed, they are submitted for the "case" design stage. The content of these diagrams depends exclusively on the analyst's interpretation and his ability to translate into the aforementioned diagrams.

A software designer to design said software, which must allow for automated capture of data generated throughout the described "case". The designer obtains the analysis diagrams and meets with the analyst to seek an explanation that allows him to maximize his correct understanding of the diagrams, based on which he can then design "the case". This design is carried out by creating other diagrams, such as database diagrams (to store the system data), screen diagrams (where data uploads, searches and processing will be performed), functional logic diagrams of "the case" (which represent the logic of the problem to be solved), architecture diagrams (which define the internal organization of "the case" in order to function effectively, reliably and sustainably: client-server, SOA: Services Oriented Architecture, among others). These diagrams represent new translations of the logic described by the requester into the technical language necessary to build the solution for "the case".

Both the analyst and the designer are professionals that have been trained with the goal of understanding the description of the case and translating it into technical analysis and design languages that can then be interpreted by those who develop the application. FIG. 1 shows a diagram comparing the prior art and the present invention, regarding the language used in each of the stages of "case" understanding and translation from the beginning of its description until software design. In the prior art, the following languages are used:

A. The language that describes "the case" (intervening role: the user, who poses the requirements): natural language
B. The analysis language of "the case" (intervening role: the systems analyst, who interprets the user's request and translates it into analysis diagrams): data flow charts, analysis use cases, along with the complementary descriptions expressed in natural language with a design-oriented focus.
C. The design language of "the case" (intervening role: the designer, the architect who interprets the analyst's work and translates it into design diagrams): diagrams (currently mostly in UML) which represent the functional design of the application; database diagrams that represent the design of the database that will store user data; architectural diagrams that represent the layered architecture of the application to be built.

The type of user that needs designed custom-made software is ordinarily not a software designer nor a software development engineer, and thus, would not be able to build it on his own. He needs the analyst and the designer to properly interpret his requirements and capture them into the resulting design of "the case".

It so happens that this is impossible in practice because the requester does not understand the design language, because of which he does not have control over the resulting design in order to ensure that "the case" he requested will be constructed. Herein lies the greatest share of deviation between the request (the problem) and the actual construction (the solution). That is, consequently, the requester would receive a design and a resulting product (a piece of software) that is not usually adjusted perfectly to his requirements, modifications or subsequent changes (which in some cases can take more time or be more complex and more expensive than had been initially expected).

The industry is making an important effort to reach a solution to this problem with CASE (Computer Aided Software Engineering) Tools. However, these tools do not function with natural language, and thus present several of the previously described limitations.

This approach to handling the technical problem necessarily produces multiple interpretations of the problem, because the translation between the language used by the user or client familiar with the process (natural language) and the language used by analysts and designers (technical languages) entails a transformation resulting in a loss of knowledge, which nobody can control precisely.

The present invention employs natural language as the only language for the description, analysis and design of the software solution, thereby minimizing a loss of knowledge that would lead to a distortion in the result.

Unlike the prior art, the present invention allows for complete description of "the case" using simple sentences in natural language. Unlike the prior art, the present invention does not require the translation of said sentences into diagrams with technical graphical notation in order to understand and transmit the knowledge of the process. Instead, said diagrams are generated automatically by the present invention based on natural language, using a single deterministic model that identifies the conceptual components of language, by applying analytical rules that implement the functional logic of said model.

Structuring the description in simple sentences, based on a predefined hierarchy of concepts, ensures the completeness of said description and enables high-quality software designs to be inferred automatically.

With the aim of facilitating understanding of the present invention and enabling easy distinction between the present invention and what is available in the prior art, the following comparison table is presented:

| | Prior art | | Present invention | |
|---|---|---|---|---|
| Stage | Language | Method | Language | Method |
| Description of the case | Natural Language | Analyst's free formulation | Natural Language | Formulation induced to achieve completeness and quality through use of questions |
| Analysis of the case | Requirements Analysis, Flow Diagrams, UML Diagrams (analysis use cases), Process Diagrams | Interpretation and handcrafting at the analyst's discretion | Natural Language | Induced formulation through precise prompts in order to identify the requirements |
| Software design | Database Diagrams, UML Diagrams (state diagrams, class diagrams, implementation use cases), Screen Diagrams, Architectural Diagrams | Interpretation and free handcrafting at the designer's discretion | Natural Language | Direct and automatic inference of the "case" designs based on the components of the step sentences |

Current prior art states that software is designed by hand or partially by hand, which by its nature poses the following problems: Ambiguity in interpreting system requirements, high cost of fixing design errors, difficulties in design scaling and development, and outdated documentation, among others. The present invention overcomes these difficulties by being based on a totally automated and industrializable process, thereby achieving conceptual precision, producing scalable evolving designs, producing automatically updated documentation, and reducing software design costs significantly.

4. GLOSSARY

Sentence: the smallest possible syntactic formation, capable of conveying a statement or expressing the content of a logical proposition.

Simple sentence: That which contains a single verb.

Complete simple sentence: from the point of view of the invention: a sentence that explicitly answers all the stated questions.

Natural language: Natural language is what we call the spoken or written language used by humans for general communication purposes.

Functional requirement: As defined in requirements engineering, functional requirements determine the system's behavior. A Global functional requirement groups other more detailed functional requirements related to the behavior of the system itself.

Class diagram: Diagrams which show the different classes that comprise a system and the relationships between each other. They also show the classes, along with their methods and attributes, as well as their interrelationships.

Universe of the case: The collection of definitions and concepts surrounding "the case".

Compound nouns: Nouns that are made up of more than one word. For example: price list, document number.

+: in the present document, it means "to concatenate", to join or add text.

Eligible language: Since different languages can be used to describe "the case", it is possible to state each of them with their respective syntactic and grammatical structures.

Concatenate: Given one or more words, concatenation means joining them into a single phrase, separated by spaces. Example: "the", "house". Concatenation of the two words yields: "the house".

Base Rule: in the present invention, a base rule is a behavioral structure defined by a question, the purpose of which is to describe the morphosyntactic sequence of the words that comprise the answer to said question.

DO: means direct object. In the present invention, it refers to the noun words that appear in What questions and follow a transitive verb.

5. BRIEF DESCRIPTION OF THE FIGURES

FIG. 1. Shows the process of natural language transformation of the present invention.

FIG. 2. Shows the stages of the process of the present invention, in order to obtain Functional Architecture Documents.

Figure 3:
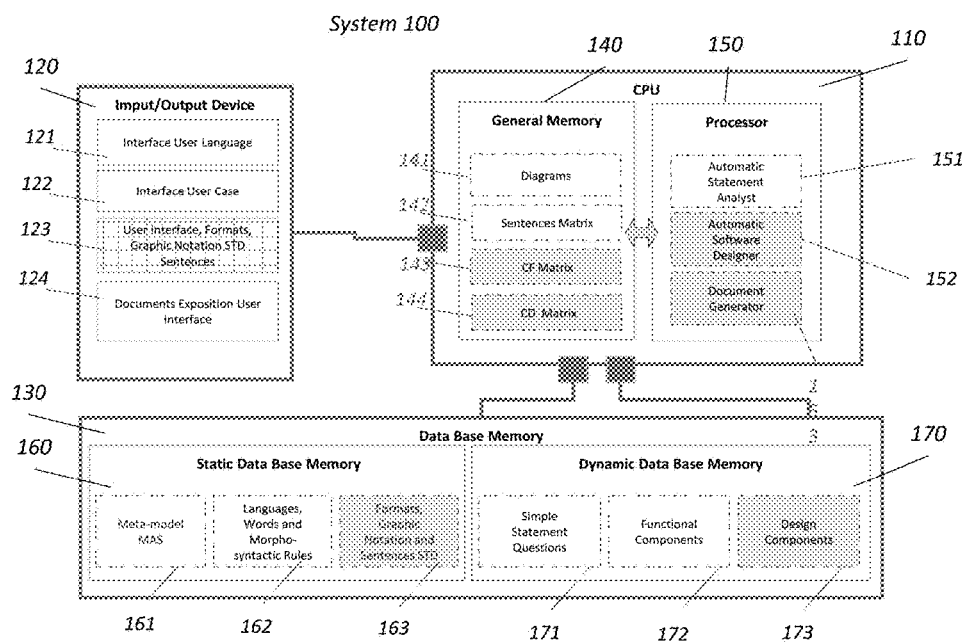

FIG. 3. Shows the system of the present invention.

FIG. 4. Shows the stages of the process of the present invention, in order to obtain Software Design Documents.

FIG. 4A. Shows stage A.

FIG. 4A1. Shows the MAS metamodel.

FIG. 4A2. Shows a Morphosyntactic Rule.

FIG. 4A3. Shows a case of MAS Metamodel application.

FIG. 4B. Shows stage B.

FIG. 4C. Shows stage C.

FIG. 4D. Shows stage D.

FIG. 4E. Shows stage E.

FIG. 4E1. Shows the functional logic of the Processor 150, configured as an Automatic Sentence Analyzer 151.

FIG. 4F. Shows stage F.

FIG. 4F1. Shows a Functional Architecture diagram.

FIG. 4G. Shows stage G.

FIG. 4G1. Shows the functional logic of the Processor 150, configured as an Automatic Software Designer 152.

FIG. 4H. Shows stage H.

FIG. 4I. Shows stage I.

FIG. 4I1. Shows a software design diagram.

FIG. 4I2. Shows the structure of a business document.

FIG. 4I3. Shows the structure of an analysis document.

Figure 5:
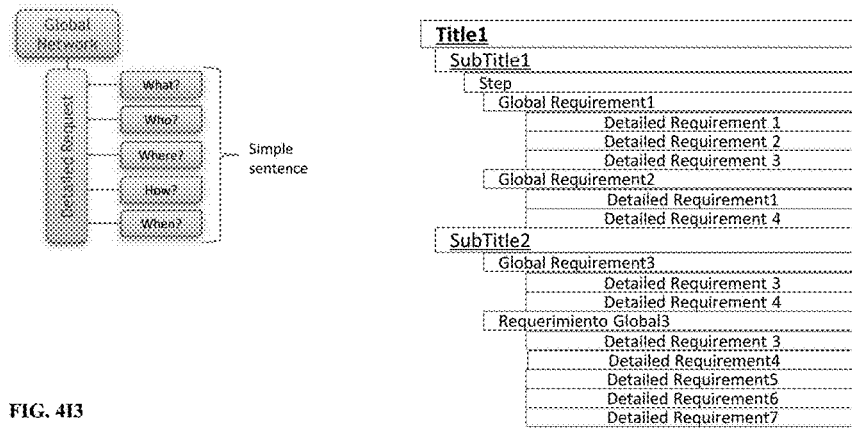
Figure 5:
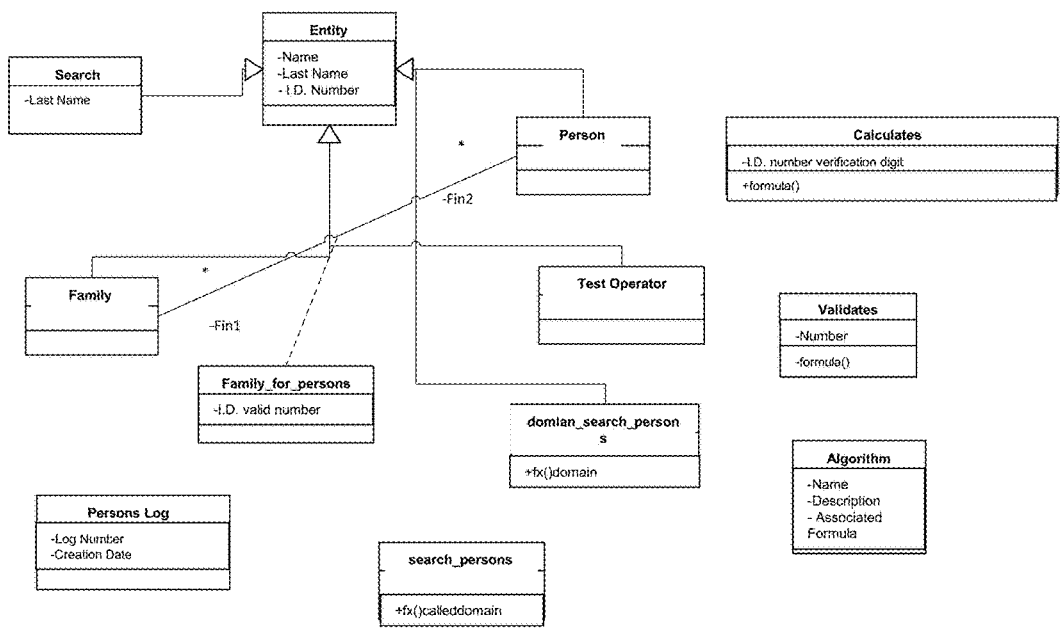

FIG. 5. Shows the example of class design.

FIG. 6 Refers to the graphical notation that is to be used in the Functional Architecture diagrams.

FIG. 7 Refers to the graphical notation for software design documents.

6. DETAILED DESCRIPTION OF THE INVENTION

The present invention provides a solution to the previously cited problems, by means of a method, implemented by a computer and a visual device, for generation of software design specification documents from requirements expressed in natural language phrases that describe a case, which are stored in knowledge bases. These phrases allow for modeling design components that are subsequently transformed and visualized as class diagrams for software design. The device can be adapted to interact with a processor.

Initially, as described in FIG. 4, the process begins with the description of "the case" in natural language. In order to perform said description in the present invention, it is necessary to establish beforehand which language will be used in the description, including its grammatical and syntactic features, such as the adjectival sequence that describes whether the adjective is located before or after the noun, and the list of words that comprise the language's articles, among others.

In order to describe "the case" in any language that possesses defined syntactic structure and grammar rules, a system such as the one described in FIG. 3 is used to input the description of "the case" in natural language by means of an Input/Output Device 120. The input texts are transferred into the main memory for later use by the Processor 150. The processor is configured to analyze, design and generate documents automatically. The results of each processing function are stored in the Database Memory 130.

The components of the system 100 from FIG. 3 are described below:

1. Input/Output device 120: the device through which the natural language texts are captured. It allows a processor to employ display media (screens, projectors, televisions, printers, monitors, mobile devices, among others) to show structures in which the user can enter "the case" description data and display the resulting documents, using the following configurations:
   a. Language User Interface 121: a visual structure that allows the user to choose the language and upload its grammatical and syntactical features, which are then stored in the Database Memory 130.
   b. Case User Interface 122: a visual structure that allows the user to upload the simple sentences that describe "the case", which are then stored in the Database Memory 130. This structure also allows the user to interact with the functions of the Processor 150 configured as an Automatic Sentence Analyzer 151 and as an Automatic Software Designer 152.
   c. Formats, Graphical Notation and STD Sentences User Interface 123: in one embodiment of the invention, the user is presented with this visual structure, which allows him to add or modify the formats, graphical notations and STD sentences available in the Static Database Memory 160, for the preparation of business, analysis and design documents built by the Processor 150 configured as an Automatic Document Generator 153.
   d. Document Display User Interface 124: a structure that allows the user to access the documents generated by the Processor 150 configured as an Automatic Document Generator 153.

2. CPU 110: the processing device of the system 100. This device is designed to carry out all of the natural language processing functions for automatic design generation and contains the main memory that allows for exchange between said functions and the other components of the system.
   a. Main Memory 140: volatile storage device used to exchange information between the input/output device, the database memory and the processor. It carries out the following functions according to its configuration:
      i. Diagrams 141: the configuration of the Main Memory that enables document processing by the Processor 150 configured as an Automatic Document Generator 153, by using the Formats, Graphical Notations and STD Sentences 163 stored in the Static Database Memory 160.
      ii. Sentence Matrix 142: the configuration of the Main Memory that enables processing of simple sentences by the Processor 150 configured as an Automatic Sentence Analyzer 151, by using the MAS Metamodel 161, the Languages, Words and Morphosyntactic Rules 162 stored in the Static Database Memory 160.
      iii. FC Matrix 143: the configuration of the Main Memory that enables processing of the functional components by the Processor 150 configured as an Automatic Sentence Analyzer 151, by using the MAS Metamodel 161, the Languages, Words and Morphosyntactic Rules 162 stored in the Static Database Memory 160.
      iv. DC Matrix 144: the configuration of the Main Memory that enables processing of the design components by the Processor 150 configured as an Automatic Software Designer 152, by using the MAS Metamodel 161, the Languages, Words and Morphosyntactic Rules 162 stored in the Static Database Memory 160.
   b. Processor 150: the device in which processing and exchange tasks are carried out. It carries out the following functions depending on its configuration:
      i. Automatic Sentence Analyzer 151: the configuration of the Processor that is mainly tasked with automatically generating the functional components from the simple sentences, and sending them to the Dynamic Database Memory 170 for storage.
      ii. Automatic Software Designer 152: the configuration of the Processor that is mainly tasked with automatically generating the design components from the simple sentences, and sending them to the Dynamic Database Memory 170 for storage.
      iii. Document Generator 153: the configuration of the Processor that is mainly tasked with automatically generating the design components from the simple sentences, and sending them to the Dynamic Database Memory 170 for storage.

3. Database Memory 130: a permanent memory that stores the data uploaded by the user and generated by the Processor 150 in its various configurations. This memory possesses two storage configurations: one static configuration and one dynamic configuration. The static configuration stores the necessary fixed data that are uploaded for one-time processing and are not specific to "the case". The dynamic configuration stores the data specific to "the case" that are uploaded for each case.

a. Static Database Memory 160:
  i. MAS Metamodel 161: the configuration of the Database Memory 130 that contains the rules of formal logic at a high level of abstraction that give rise to the Morphosyntactic Rules that are stored in the Languages, Words and Morphosyntactic Rules structure 162 of the Database Memory 130.
  ii. Languages, Words and Morphosyntactic Rules 162: the configuration of the Database Memory 130 that contains the features of the eligible languages, the special words of each eligible language and its Morphosyntactic Rules.
  iii. Formats, Graphical Notations and STD Sentences 163: the configuration of the Database Memory 130 that contains the Formats that apply to the documents, the graphical notation that applies to the diagrams and the STD Sentences necessary for the preparation of analysis documents.
b. Dynamic Database Memory 170:
  i. Simple Sentences Questions 171: the configuration of the Database Memory 130 that contains the Simple Sentences uploaded by the user and the answers to the questions When, Who, What, How and Where that correspond to each Simple Sentence.
  ii. Functional Components 172: the configuration of the Database Memory 130 that contains the Functional Components generated automatically by the Processor 150 configured as an Automatic Sentence Analyzer 151.
  iii. Design Components 173: the configuration of the Database Memory 130 that contains the Design Components generated automatically by the Processor 150 configured as an Automatic Software Designer 152.

In using the system described above, the present invention carries out the sequence of stages described in FIG. 4 and also below:

Stage A. Using the Input/Output Device 120 to upload the MAS Metamodel 161 into the logical structure of the MAS metamodel 161 of the Static Database Memory 160.

Stage B. Using the Language User Interface 121 of the display device 120 to enter the eligible languages, the grammatical and syntactical features of each eligible language and to store those data in the logical structure of Languages, Words and Morphosyntactic Rules 162 of the Static Database Memory 160;

Stage C. Using the Case User Interface 122 of the display device 120 to enter the description of "the case" as text in one of the natural languages selected from the list of eligible languages from Stage B. Identifying the steps of "the case" and then storing them in the logical structure of Simple Sentences and Questions 171 of the Dynamic Database Memory 170;

Stage D. Identifying the simple sentences of "the case" that correspond to the steps based on Stage C and using the Case User Interface 122 of the display device 120 to upload them and then storing them in the logical structure of Simple Sentences and Questions 171 of the Dynamic Database Memory 170.

Stage E. Automatically identifying the functional components (it should be understood that a functional component corresponds to each word of the sentence extracted and automatically characterized by the Processor 150) of the simple sentences based on Stage D, with a Processor 150 configured as an Automatic Sentence Analyzer 151 that functions according to the logical structure in the MAS Metamodel 161 uploaded in Stage A. The Processor 150 continues to store said functional components temporarily in the logical structure of the FC Matrix 143 of the Main Memory 140. These components are finally stored in the logical structure of Functional Components 172 of the Dynamic Database Memory 170;

Stage F. Automatically identifying the design components of "the case" based on the functional components from Stage E. It should be understood that a design component refers to each software design model that corresponds to a functional component generated automatically by the Processor 150. The design components are created using a Processor 150 configured as an Automatic Software Designer 152, which in one embodiment of the invention functions according to the logical structure in the MAS Metamodel 161 uploaded in Stage A. The Processor 150 continues to store said design components temporarily in the logical structure of the DC Matrix 144 of the Main Memory 140. These components are finally stored in the logical structure of Design Components 173 of the Dynamic Database Memory 170;

Stage G. Using the Formats, Graphical Notations and STD Sentences User Interface (of the display device 120) to enter the output formats of the business, analysis and design documents, the parameters of standard sentences for the requirements and the graphical notation for design diagrams, and storing them in the logical structure of Formats, Graphical Notations and STD Sentences 163 of the Static Database Memory 160;

Stage H. Automatically generating the business documents (a business document is understood to be a step-by-step description, in natural language, of the problem to be solved) from the simple sentences from Stage D, the analysis documents (an analysis document is understood to be a description of the functional requirements of the software to be constructed) based on the functional components from Stage E, and the design documents (a design document is understood to be a document that contains the instructions for constructing the software) based on the design components from Stage F, by means of a Processor 150 configured as a Document Generator 163, using the Formats, Graphical Notations and STD Sentences defined in Stage G;

Stage I. Automatically generating the Functional Architecture documents (a functional architecture document is understood to be a graphical diagram that structures the meaning of the natural language text in summary form by representing the essential concepts of the meaning) based on the functional components from Stage E, by means of a Processor 150 configured as a Document Generator 163, using the graphical notation defined specifically for this type of Document.

The stages of the process are described in detail below:

Stage A. Uploading the MAS Metamodel

In this stage, the MAS Metamodel and its axiomatic principles are described in detail. This Metamodel is used to establish the behavior of the Processor 150 in its configuration as an Automatic Sentence Analyzer 151.

FIG. 4A1 shows a class model, according to the Object-Oriented paradigm, that represents the rules that this Metamodel defines in order to model the logic for interpretation of natural language. These rules are used as the base Morphosyntactic Rules that the Processor 150, configured as an Automatic Sentence Analyzer 151, used to generate the functional components in Stage D.

In this stage, the MAS Metamodel is created by the following substages (FIG. 4A):

Substage A1. Storing MAS Metamodel

In this substage, the logic of the MAS Metamodel 161 is uploaded to the Static Database Memory 160.

This logic establishes that every word contained in a natural language description is a Word 161-1. When the word is a transitive verb, two new words are automatically defined: a Performer Word 161-2, the name of which is the transitive verb plus the agentive suffix "ER" and a Performable Word 161-3, the name of which is the transitive verb plus the suffix "BLE". The transitive verb is a Performance Word 161-4 which has a relationship 161-5 with the Performer Word 161-2 and another relationship 161-3 with the Performable Word 161-3.

The Words 161-1 are related to each other in such a way that a word that is not a transitive verb can establish an inheritance relationship 161-9 with a Performer Word 161-2 and/or an inheritance relationship 161-8 with a Performable Word 161-3.

Each Word 161-1 can define an inheritance relationship 161-0 with another Word 161-1. Each Word 161-1 can define an association relationship 161-7 with another Word 161-1.

The use of the options offered by the MAS Metamodel depends on the morphosyntax of the sentence being processed in Stage D.

In this way, all words in a description, as a whole, can be represented by this metamodel, which defines an axiomatic rule for the language, given that it is fulfilled in all cases and represents the basis on which to model any morphosyntactic rule of any language.

Substage A2. Storing the MAS Logic for Morphosyntactic Rules.

In this substage, the logic of the MAS Metamodel is uploaded to the Static Database Memory 161. Said logic defines a method for characterizing natural language words in order to determine their meaning in different functional application contexts. The structures that deal with the form and syntax of natural language are called morphosyntactic structures.

In the present invention, a collection of guidelines for handling natural language is considered a Morphosyntactic rule. Such a rule is composed of the guidelines for handling text that define: a) Question logic: to which question (When, Who, What, How, Where) the word within a simple sentence belongs, b) Step type logic: what type of verb comprises the What question (FX, CC, QS, L, F) and c) Word logic: what type of word it is. The type of a word is determined by its grammatical characterization as verb (VERB), noun (NOUN), preposition (PREP), article (ART), conjunction (CONJ), adverb (ADV).

An identifier is defined for each Morphosyntactic rule. The identifier of a Morphosyntactic rule is composed by concatenating the types of the words that make up the sentence, except for types Performer, Performable and Performance. It may be, for example, ART-NOUN-VERB-ART-PREP-NOUN, for a sentence that is made up of a sequence of words with the following types: article, noun, verb, article, preposition, noun. These types of words can be handled in general, or can refer to specific words of its type. For example, the Rule VERB(is)-PREP-NOUN indicates that the sentence that this rule applies to contains a verb, and specifically the word "is" within the word type VERB, followed by any preposition PREP and then any noun NOUN. This rule would apply to the following sentences: [it] is a monkey, [it] is a moon.

That is to say that for every simple sentence there is a Morphosyntactic Rule that defines its structure as a function of the types of words that comprise it.

Given a simple sentence, before the corresponding Morphosyntactic Rule identifier is composed, the Processor 150 configured as an Automatic Sentence Analyzer 151, excludes the special words uploaded in Substage B2, articles conjunctions and prepositions, from the sentence. It then searches the Static Database Memory 160 for the Morphosyntactic rules within the Languages, Words and Morphosyntactic Rules 162 configuration. Once the rule with its corresponding identifier is located, if there is more than one rule with the same corresponding identifier, it searches within this collection for matches for the specific words from the types of words that were excluded during the composition of the rule identifier of the sentence. If there is a match, it assigns the rule that matches the specific excluded word(s). If there is no match, it assigns the general rule.

The MAS Metamodel defines the following base rules from which specific rules for different cases are derived.

Base Rules

There are two base rules, with their respective specialties, associated with the What question:

VERB-NOUN Rule:
  General case: VERB-NOUN Rule 161-12: allows for modeling sentences that have a verb, noun, noun structure.
  Specific case: VERB(is)-NOUN Rule 161-10: allows for modeling sentences that have a verb, noun structure, in which the verb is the verb "to be". This verb is a special verb from the point of view of MAS Metamodel application.

VERB-NOUN-PREP-NOUN Rule:
  General case: VERB-NOUN-PREP-NOUN Rule 161-11: allows for modeling sentences that have a verb, noun, preposition, noun structure.
  Specific case: VERB(hold responsible)-NOUN-PREP-NOUN Rule 161-13: allows for modeling sentences that have a verb, noun structure, in which the verb is the verb "to hold responsible". This verb is a special verb from the point of view of MAS Metamodel application.
  Specific case: VERB(link)-NOUN-PREP-NOUN Rule 161-14: allows for modeling sentences that have a verb, noun structure, in which the verb is the verb "to link". This verb is a special verb from the point of view of MAS Metamodel application.

Similarly, there is a base rule to model the Who within the simple sentence:

NOUN Rule: it is present in all simple sentences and allows for modeling the behavior of the main noun that refers to the subject.

For When, How and Where questions, which do not require mandatory completion, the types of words that appear in the answer are identified and the necessary rule identifiers are generated.

In one embodiment of the invention, the user can add base rules and Morphosyntactic rules, always dependent on the logic of the MAS Metamodel.

Given a simple sentence in natural language, and once the Morphosyntactic rule is located, the Processor 150, configured as an Automatic Sentence Analyzer 151, generates the functional components by applying the guidelines for handling text defined by said rule: a) Questions logic; b) Step type logic and c) Word logic, as shown in FIG. 4A2.

(a) Questions Logic: Determines the Belonging Question of the Words to which the Rule is Applied It must be noted that a description is a collection of simple sentences that describe a process. Each step of such process is corresponded with one simple sentence derived from the answer to the questions Who, What, Where, How, When.

(b) Step Type Logic: Determines the Belonging Step Type of the Words to which the Rule is Applied Each step can be classified under a Step Type. The Step Type is determined in a rule, by the specific word associated with the Verb within the What question. Every Morphosyntactic Rule is based on the MAS Metamodel, and depending on the specific verb linked to the What question, it can be classified under the following types: Check/Confirm; Query/Search; Calculation; Relationship; Functional; Notification/Alert.

CC Step: (Step that Determines the Checking/Confirmation Actions)

These are steps in which the verb defines checking or confirmation actions, such as: check, confirm, restrict, and the like. In this case, the verb is transitive and the noun that follows it is always coupled to a sentence that represents a mathematical logic for the system.

This step type is assigned a VERB-NOUN Morphosyntactic Rule identifier and it adds the mathematical description of the checking/confirmation logic.

Some examples of this type of sentence are: check that the items have a positive inventory (VERB-NOUN; "have positive inventory" is the mathematical logic of confirmation), confirm that the client has a tax ID number (VERB-NOUN; "has a tax ID number" is the mathematical logic of confirmation), restrict the intake of expired merchandise (VERB-NOUN; "expired merchandise" is the mathematical logic of confirmation).

QS Step (Step that Includes Query/Search Actions)

These are steps in which the verb defines query or search actions, such as: search, locate, select, query, indicate, display, show, and the like. In this case, the verb is transitive and the noun that follows it indicates the object of the search/query.

This step type is assigned a VERB-NOUN Morphosyntactic Rule identifier, in which the noun describes the object of the search, which means that the verb applies to a collection of instances of the noun.

Some examples of this type of sentence are: query the items (VERB-NOUN), show the balances (VERB-NOUN), display the data (VERB-NOUN), show the results (VERB-NOUN), search the items (VERB-NOUN), locate the spare parts (VERB-NOUN), select the clients (VERB-NOUN).

FX Step (Step that Includes Explicit Calculation Actions)

They are steps in which the verb explicitly defines calculation actions, such as: calculate, group, average, add, and the like. In this case, the verb is always coupled to a sentence that represents a mathematical logic for the system.

This step type is assigned a VERB-NOUN Morphosyntactic Rule identifier, in which the noun describes the logic of the calculation that the verb denotes.

Some examples of this type of sentence are: calculate the total sales (VERB-NOUN), group the items by color (VERB-NOUN), average last month's cost (VERB-NOUN).

L Step (Step that Contains Linking Actions)

They are steps in which the verb defines the linking actions, such as: relate, link, associate, compose, and the like. In this case, the verb is followed by at least two nouns.

The verb can represent any of the following models:

Model 1:

This step type is assigned a VERB(link)-NOUN-PREP-NOUN Morphosyntactic Rule identifier, in which the specific verb can be 'link' or any synonym and the preposition, generally 'with', though it may vary.

Some examples of this type of sentence are:

link the items with the prices (VERB(link)-NOUN-PREP-NOUN), link the equipment with the spare parts (VERB(link)-NOUN-PREP-NOUN), associate the taxes with the shares (VERB(link)-NOUN-PREP-NOUN), compose the product with the inputs (VERB(link)-NOUN-PREP-NOUN).

Model 2:

This step type is assigned a VERB(hold responsible)-NOUN-PREP-NOUN Morphosyntactic Rule identifier, in which the specific verb can be "hold responsible" or any synonym and the preposition, generally "for", though it may vary.

Some examples of this type of sentence are: hold the client responsible for the payment (VERB(hold responsible)-NOUN-PREP-NOUN), hold the employee responsible for inventory control (VERB(hold responsible)-NOUN-PREP-NOUN).

Model 3:

This step type is assigned a VERB-NOUN-PREP(a)-NOUN Morphosyntactic Rule identifier, in which the specific preposition can be a, an, or any other preposition. Some examples of this type of sentence are: measure the item with a unit of measurement (VERB-NOUN-PREP(a)-NOUN), value the item with a list of prices (VERB-NOUN-PREP(a)-NOUN).

F Step (Step that does not correspond to any of the previous types) They are steps in which the verb does not correspond to any of the previous types because it refers to an action that is specific to "the case".

The verb can present any of the following models:

Model 1:

This step type is assigned a VERB-NOUN Morphosyntactic Rule identifier and is used for all of the verbs that are not listed as a specific word in the CC, QS or FX step types, nor in any of the models of this same type.

Transitive verb followed by one or more nouns. For example: Buy an item (VERB-NOUN), Sell fruits (VERB-NOUN), Fix the tools (VERB-NOUN), Solve problems (VERB-NOUN).

Model 2:

This step type is assigned a VERB(is)-NOUN Morphosyntactic Rule identifier, in which the specific verb is "to be". This is a very special verb that describes the nature of the noun. Some examples of this type of sentence are: [it] is fruit (VERB(is)-NOUN), [it] is a company (VERB(is)-NOUN).

(c) Words Logic: Determines the Belonging Word Type Structure of the Analyzed Sentence and Question The Processor 150, configured as an Automatic Sentence Analyzer 151 (FIG. 4E1), carries out the following actions in order to obtain the associated functional components from the words of each simple sentence:

For the language of "the case" and from the logical structure of the Languages, Words and Morphosyntactic Rules 162 of the Static Database Memory 160, it takes the verb endings (VE) and the list of special words (SW), within which are the list of grouping words (GRW) and the list of excluded words (EW). It also takes the Morphosyntactic rules that define the guidelines to be applied from logical structure.

It takes the simple sentences of "the case", structured in the corresponding questions, from logical structure of the Simple Sentences and Questions 171 of the Dynamic Database Memory 170.

It assigns a sequential number to each simple sentence of "the case".

For each simple sentence of "the case", and for each question, it takes the words one by one and characterizes them according to word type as follows:

if the question is How, it compares the endings of each word in the question to the verb endings VE in order to identify the verbs. Once the verbs are identified, it compares the remaining words to the list of special words SW in order to identify prepositions, articles, conjunctions and adverbs. The words that follow the verbs and are not SW are nouns. The words that follow the nouns can be SWs that are members of the grouping words GRW list, in which case the GRW plus the words that immediately precede and follow it constitute a grouped noun. The remaining words that are not SWs are adjectives.

if the question is What, the first word word is a verb. Once the verbs are identified, it compares the remaining words to the list of special words in order to identify prepositions, articles, conjunctions and adverbs. If the verb is transitive, the word that follows the verb is not a SW; it is a noun that behaves as a direct object (DO). The words that follow the nouns can be SWs that are members of the grouping words GRW list, in which case the GRW plus the words that immediately precede and follow it constitute a grouped noun. The remaining words that are not SWs are adjectives.

if the question is Who, it compares the remaining words to the list of special words in order to identify prepositions, articles and conjunctions. The words that follow the nouns can be SWs that are members of the grouping words GRW list, in which case the GRW plus the words that immediately precede and follow it constitute a grouped noun. The remaining words that are not SWs are adjectives.

The MAS Metamodel and the Morphosyntactic Rules structure is applied in Substage E4 to identify the functional components that are useful in creating Functional Architecture documents, in Substage G6 to generate the software design components, and in Substage H4 to define the graphical notation associated with the software design MAS Metamodel. These substages represent preferred embodiments of the invention in which the transitive verbs of the text of "the case" are handled as defined in Substage A1.

Stage B. Entering the Features and the Structure of the Language

In this stage (FIG. 4B), the languages that will be used to describe "the case" in natural language and its morphosyntactic features are defined by means of the following substages:

Substage B1. Defining the Order of Adjectives

The order of adjectives refers to the placement of adjectives relative to the noun of a language.

In the input/output device 120, configured as a Language User Interface 121, the appropriate order of adjectives of the language is defined, from the list of available orders of adjectives: Order 1: noun+adjective; Order 2: adjective+noun; Order 3: modified adjective+modified noun, Order 4: adjective+modified noun, Order 5: modified adjective+noun. For example, for the English language, the appropriate order of adjectives is adjective+noun.

Substage B2. Uploading the Special Words

In the input/output device 120, configured as a Language User Interface 121, the special words of the language defined in substage B1 are uploaded. The special words are used by the Processor 150, configured as an Automatic Sentence Analyzer 151, to determine which words are to be excluded from the sentence analysis. In the context of the present invention, articles (ART), prepositions (PREP), conjunctions (CONJ) and adverbs (ADV) are considered to be the special words of languages. In the English language, "a" and "the" are examples of articles, "for" and "with" are examples or prepositions, "and" and "or" are examples of conjunctions, and "how" and "where" are examples of adverbs.

Substage B3. Uploading the Grouping Words

In the input/output device 120, configured as a Language User Interface 121, the grouping words of the language defined in substage B1 are uploaded. In the present invention, grouping words are special words from those defined in Substage B2 that can link two other words to make a compound word. Such is the case of the word "list of prices", grouped with the word "of".

Substage B4. Uploading the Verb Endings

In the input/output device 120, configured as a Language User Interface 121, the appropriate verb endings of the language from Substage B1, that correspond to the final syllable of regular verb endings, are uploaded. The verb ending "-ing" is an example for the English language.

Stage C. Entering the Description of "the Case"

In this stage (FIG. 4C), the case is described in natural language by the following sub stages:

Substage C1. Selecting the Language for the Description of the Case

In the input/output device 120, configured as a Case User Interface 122, the language in which "the case" will be described is selected. The language is chosen from the list of eligible languages uploaded in Stage B.

Substage C2. Identifying the Components that Structure the Context of "the Case"

In one embodiment of the invention, the components that structure the context of "the case" are identified.

This stage deals with the Static Vision and the temporal Dynamic Vision of the Universe of "the case". In Static Vision, the conceptual structure of "the case" is observed from a global perspective, without taking into account what happens as time passes, dividing the concepts into dimensions or major aspects that compose it: layers and resources. In Dynamic Vision, it is observed from the perspective of the events that occur as time passes (temporal activities) and in the order that they occur: processes, moments and steps.

To structure the description of "the case" in a suggested embodiment of the invention, the layers, resources, processes, subprocesses and moments are identified.

(a) Identifying the Layers of "the Case"

A layer is understood to be a hierarchy of information that takes part in a process and could be handled independent from the others, which could function in isolation with well differentiated inputs and outputs. For example, these two layers are identified: the data layer (where the input data of a process are structured and accessed) and the calculation layer (where calculations are carried out using said data).

(b) Identifying the Resources Used in "the Case"

Resources are the components that are subject to transformation throughout the process and allow for access to other resources, such as the result of the transformation process. For example, inventory items are resources that are subjected to the sale process.

(c) Identifying the Processes within "the Case"

Processes are actions or groups of actions that transform the resources. For example, the process of "marketing inventory items".

(d) Identifying the Subprocesses of Each Process of "the Case"

Subprocesses are parts of a process that allow for analysis of the process by fragments. For example, "providing a quote" and "sale" can be subprocesses included in the process of "marketing inventory items".

(e) Identifying the Moments of "the Case"

In the present invention, moments are partitions of a subprocess that announce the occurrence of an event that is relevant to the subprocess. Fr example, "When the client is interested" is a moment that occurs within the subprocess of "providing a quote".

Substage C3. Identifying the Steps of "the Case"

Steps are activities that are carried out at any given moment. Example: the activities at the moment "When the person enters the testing office" might be: Asking for his identification document, Recording the data from said identification document, Performing a search of his family group, Inquiring about his current job.

In order to ensure that the description of "the case" is complete, all of the steps, even those that are generally omitted because they seem obvious, must be included.

Since steps are sentences and their verb determines the action to be performed, they can be classified according to the type of action that the verb denotes and by analyzing the nouns that follow the verb (not including the special words defined in Substage B2: articles, conjunctions, propositions, and prepositions).

The guidelines for classifying the sentences by Step Type is called the Step Type Logic, as a part of the Morphosyntactic Rules defined in Substage A2 and described below:

CC Step: (Step that Contains Checking/Confirmation Actions)

These are steps in which the verb defines checking or confirmation actions, such as: Check, Confirm, Restrict, and the like. In this case, the verb is always coupled to a sentence that represents a mathematical logic for the system. Some examples of this type of sentence are: Check that the items have a positive inventory, Confirm that the client has a tax ID number, Restrict the intake of expired merchandise.

QS Step (Step that Includes Query/Search Actions)

These are steps in which the verb defines query or search actions, such as: Search, Locate, Select, Query, Indicate, Display, Show, and the like. In this case, the verb is always followed by a noun or a direct object. Some examples of this type of sentence are: Query the items, Show the balances, Display the data, Show the results, Search the items, Locate the spare parts, Select the clients.

FX Step (Step that Includes Explicit Calculation Actions)

These are steps in which the verb specifically defines calculation actions, such as: Calculate, Group, Average, Add, and the like. In this case, the verb is always coupled to a sentence that represents a mathematical logic for the system. Some examples of this type of sentence are: Calculate total sales, Group the items by color, Average last month's cost.

L Step (Step that Includes Linking Actions)

These are steps in which the verb defines linking actions, such as: Relate, Link, Associate, Compose, and the like. In this case, the verb is followed by at least two nouns. Some examples of this type of sentence are: Link the items with the prices, Link the equipment with the spare parts, Associate the taxes with the shares, Compose the product with the inputs F Step (Step that does not Correspond to any of the Previous Types)

These are steps in which the verb does not correspond to any of the previous types because it refers to an action that is specific to "the case". The verb can represent any of the following models: Model 1: Verb followed by one or more nouns. For example: Buy an item, Sell fruits, Fix the tools, Solve problems. Model 2: A verb that is not followed by a noun. For example: Enter, Exit.

The steps are generally described in the following order: 1) F Step, 2) CC Step, 3) QS Step, 4) FX Step, 5) L Step.

Stage D. Identifying and Storing the Simple Sentences of "the Case"

In this stage, the simple sentences of "the case" are listed, taking each paragraph of the description of "the case" and extracting the sentences with only one verb, in order to upload them into the Case User Interface 122 of the Input/Output Device 120. For example, if the descriptive paragraph is: "The item is an inventory item. The person measures the item in a unit of measurement and places the Order, for which he is responsible, and links it to an Order Type", the corresponding simple sentences are: "The person measures the item in a unit of measurement", "The person places the Order", "The organization holds the person responsible for the Order", "The item is an inventory item", "The person links the Order to an Order Type."

In freely written texts, there are sentences with implicit subjects, generally separated by conjunctions, within the same paragraph. In that case, the subject is exposed in order to form a complete sentence, with the purpose of converting sentences with implicit subjects into simple sentences with explicit subjects. For example, there is an implied subject in the following sentence separated by the conjunction "and": "The person measures the item in a unit of measurement and places the Order", and is turned into two simple sentences: "The person measures the item in a unit of measurement", "The person places the Order".

In this step, it must be noted that a description is a collection of simple sentences that describe "the case". One simple sentence that is derived from the answer to the questions Who, What, Where, How and When corresponds to each step of the process.

Once the simple sentences are identified and those with implicit subjects are completed, they are uploaded into the Case User Interface 122 of the Input/Output Device 120.

In this stage (FIG. 4D), the simple sentences of "the case" are identified by the following sub stages:

Substage D1. Answering the Questions for Each Step of "the Case"

In this stage, each simple sentence of "the case" is used to answer the questions When, Where, What, How and When.

For each simple sentence stored in the Simple Sentences and Questions Dynamic Database Memory 171, the Processor 150 displays each sentence in the Case User Interface 122 of the Input/Output Device 120, asking the questions Who, What, Where, How and When. For each sentence shown, the user enters the answer, while ensuring that each answer is a constituent part of the meaning of the sentence. In some cases, it may not be possible to answer one or several of the questions.

The answers to the aforementioned questions make explicit every part of the simple sentence, which, in a preferred embodiment of the present invention, must be written in the present tense.

The guidelines for classifying the sentences by question type is called the Questions Logic, as a part of the Morphosyntactic Rules defined in Substage A2.

Substage D2. Concatenating the Answers from Each Step

Once the answers to the questions are uploaded, each answer is concatenated in the following order: When, Who, What, How, Where. In this way, the texts of the answers are joined as one simple sentence and stored in the logical structure of the Simple Sentences and Questions 171 of the Dynamic Database Memory 170.

The answers to the aforementioned questions make explicit every part of the simple sentence, which must be written in the present tense.

For example, for the incomplete sentence: "Ask for his identification document", if the previously described method is applied, the result is a simple sentence: When the person enters, the system operator records the number of the identification document.

Stage E. Identifying and Storing the Functional Components.

In the context of the present invention, it must be understood that a functional component corresponds to each of the words of the sentence that were automatically extracted and classified by the Processor 150, according to the grammatical and syntactic structure of the language in which it was expressed.

In this stage (FIG. 4E), the substages for identifying the functional components of the sentence are described.

Substage E1. Deconstructing the Simple Sentence into Words and Identifying them

The functional components generated by the Processor 150 are divided into the following types:
  Noun functional components
    Identified in the What→Noun—Direct Object (DO)
    Identified in the Who→Noun—Person (PER)
    Identified in the When→Noun (NOUN)
    Identified in the How→Noun (NOUN)
  Adjective functional components
    Identified in any of the questions→Adjective (ADJ)
  Verb functional components
    Identified in the What→Verb (VERB)
    Identified in the How→Verb (VERB)
  Adverbial functional components
    Identified in the How→Adverb (ADV)

The guidelines for structuring the words is called the Words Logic, as a part of the Morphosyntactic Rules defined in Substage A2 and described below:

In this substage, the Processor 150, configured as an Automatic Sentence Analyzer 151, carries out the following actions for each simple sentence of "the case":

(a) Listing Words.

For every sentence, list each of its words.

(b) Identifying the Words to be Excluded.

Exclude from functional component selection those words to be excluded as defined in Substage B2; except in the case when such words are part of grouped nouns, such as: list of prices, box of cookies.

(c) Identifying the Verbs.

Identify verbs by comparing the ending of each word to the list of verb endings defined in Substage B4 or as the first word of the answer to the question What in the simple sentence.

(d) Identifying Nouns.

Identify as nouns the words that are not verbs and were not excluded.

(e) Tagging Nouns as &Attribute

Some nouns behave like &attributes. An &attribute is understood to be the name of a feature of another noun, which is not an adjective. Regarding the list of identified nouns, the &attributes are selected manually in one embodiment of the invention. In another embodiment, the processor recognizes them automatically when the nouns are listed within parentheses in the text. Example: in the sentence "upload the document number of the client", 'document number' is an &attribute of 'client'.

(f) Identifying Grouped Nouns.

Identify as nouns the grouped nouns when there are two consecutive nouns with a special word in between them that acts as a link.

(g) Identifying the Functional Components Based on the Words.

From the list of classified words, the nouns and verbs are identified as functional components and classified as VERB, DO, NOUN, PERSON accordingly.

(h) Checking for the Previous Existence of Each Functional Component One by One.

When a new functional component of any type is identified, check if it previously exists. If not, it is created. If if exists, it continues.

(i) Associating the Functional Components with the Question that they Answer.

Classify the functional components by type based on the question to which the word belongs:
  i. If it belongs to When: the words grouped with a verb are adverbial functional components (ADV).
  ii. If it belongs to What: the nouns that follow the verb are functional components of the direct object (DO) type.
  iii. If it belongs to Who: the first noun is a person (PERS) functional component.

The Processor 150, configured as an Automatic Sentence Analyzer 151, carries out the following actions, as shown in FIG. 4E1, in order to obtain the associated functional components from the words of each simple sentence:

For the language of "the case", it takes the verb endings (VE), the list of special words (SW), within which are the list of grouping words (GRW), the list of excluded words (EW), from the logical structure of the Languages, Words and Morphosyntactic Rules 162 of the Static Database Memory 160.

It takes the simple sentences of "the case", structured in the corresponding questions, from the logical structure of the Simple Sentences and Questions 171 of the Dynamic Database Memory 170.

It assigns a sequential number to each simple sentence of "the case".

For each simple sentence of "the case", for each question, it takes the words one by one and characterizes them according to word type as follows:

if the question is How, it compares the endings of each word in the question to the verb endings VE in order to identify the verbs. Once the verbs are identified, it compares the remaining words to the list of special words SW in order to identify prepositions, articles, conjunctions and adverbs. The words that follow the verbs and are not SW are nouns. The words that follow the nouns can be SWs that are members of the grouping words GRW list, in which case the GRW plus the words that immediately precede and follow it constitute a grouped noun. The remaining words that are not SWs are adjectives.

if the question is What, the first word is a verb. Once the verbs are identified, it compares the remaining words to the list of special words in order to identify prepositions, articles, conjunctions and adverbs. If the verb is transitive, the word that follows the verb is not a SW; it is a noun that behaves as a direct object (DO). The words that follow the nouns can be SWs that are members of the grouping words GRW list, in which case the GRW plus the words that immediately precede and follow it constitute a grouped noun. The remaining words that are not SWs are adjectives.

if the question is Who, it compares the remaining words to the list of special words in order to identify prepositions, articles and conjunctions. The words that follow the nouns can be SWs that are members of the grouping words GRW list, in which case the GRW plus the words that immediately precede and follow it constitute a grouped noun. The remaining words that are not SWs are adjectives.

Substage E2. Adding Functional Components not Included in the Description.

In one embodiment of the invention, a user adds functional components that are not present in the list of automatically identified functional components. Proceeding with the same example:

The number of the identification document is an &attribute detected automatically from the sentence.

The person's age is an &attribute added by the user.

In one embodiment of the invention, the corresponding step and simple sentence are created automatically for each functional component that is added.

Substage E3. Enriching the Functional Components.

In one embodiment of the invention, the user adds the formula expressions associated with the FX- and CC-type steps, and the messages associated with said steps.

(a) Adding Formula Expressions.

In one embodiment of the invention, the user adds the formula expressions that describe the mathematical behavior of "the case" for all CC- and FX-type steps. For example:

{fx expression}="(param1,param2,param3)
    expression=param1*param2/param3"

(b) Adding Messages.

In one embodiment of the invention, a user adds the error, validation, and warning messages. For example:

{warning message}="The value cannot be greater than zero"
{ok message}="The datum was saved correctly"
{error message}="Data reading error"

Substage E4. Applying Morphosyntactic Rules to Functional Components

In one embodiment of the invention, the user can enable the use of Morphosyntactic rules, so that the Processor 150 complies with the logic defined in Substage A2.

In this embodiment, each word of a simple sentence is classified as a Word 161-1 according to the MAS Metamodel from FIG. 4A1, and is assigned one of the following Word types: VERB, NOUN, ART, CONJ, ADJ. Performer 161-2 and Performable 161-3 Words are also created, assigning the Performance 161-4 class to transitive verbs. All of the Words 161-1, classified by type, are the functional components. As shown in FIG. 4D, once each functional component is created, it is linked to the sentence from which it derives, to the question it belongs to, the corresponding word type, and to the Morphosyntactic Rule identifier that represents the sequence of word types that make up the question, as indicated in Substage A2.

During functional component selection, the special words defined in Substage B2, except in the cases that the corresponding Morphosyntactic Rule marks it as a specific word.

In this embodiment, the Processor 150 creates two new functional components for each transitive verb. A functional component named as the verb plus the agentive suffix "ER" (Performer 161-2) and a functional component named as the verb plus the suffix "BLE" (Performable 161-3). The transitive verb is the Performance 161-4 Word. For the noun that carries out the transitive verb, the Processor 150 creates a verb "is" that is associated with the ER of the verb. For the target noun (the direct object of the sentence), the processor creates a verb "is" that is associated with the BLE of the verb.

Stage F. Generating the Functional Architecture Documents

In this stage (FIG. 4F), the Processor 150, configured as a Document Generator 153, generates the Functional Architecture documents, using the formats and notations stored in the logical structure of Formats, Graphical Notations and STD Sentences 163 of the Static Database Memory 160 and displays them in the Document Display User Interface 124 of the Input/Output Device 120.

In this stage (FIG. 4F), the Functional Architecture documents are generated by the following substages:

Substage F1. Establishing Morphosyntactic Rules for Functional Architecture

As established in Stage A, for each transitive verb followed by a prepositions "to" or "to the", the processor creates the following for the noun that carries out the verb: a syntactic component, the name of which is the verb plus the agentive suffix "er" (hereinafter called the ER of the verb), and it creates the following for the noun that receives the action of the verb: a syntactic component, the name of which is the verb plus the suffix "ble" (hereinafter called the BLE of the verb). The processor creates a new noun called "Performance of the verb" between the source noun and the ER of the verb. For the source noun, the processor creates a verb "is" that is associated with the BLE of the verb. For the target noun, the processor creates a verb "is" that is associated with the ER of the verb.

Substage F2. Defining the Graphical Notation to be Used in the Functional Architecture Document In this stage, using the Formats, Graphical Notation, and STD Sentences User Interface 123 of the Input/Output Device 120, the graphical notation that is to be used in the Functional Architecture diagrams is defined, indicating the graphical component to be used in the diagram for each functional component, according to the corresponding word type. Storing the defined graphical notations in the Database Memory 130. In this way, the user enters the graphical notations in the visual grid that is displayed by the Formats, Graphical Notation, and STD Sentences User Interface 123, as that shown in FIG. 6.

Substage F3. Generating the Functional Architecture Documents

The Processor 150, configured as a Document Generator 153, takes the functional components stored in the Functional Components logical configuration 172 of the Dynamic Database Memory 170, and constructs a Functional Architecture document, using the notation defined in Substage F2, applying the MAS Metamodel that is in the MAS Metamodel 161 logical structure of the Static Database Memory 160. In order to generate the Functional architecture diagram, the processor scans the list of functional components and applies the following rules until it produces a diagram such as that shown in FIG. 4F1:

Rule 1: For each NOUN-type functional component, draw a FNOUN graphical element with a FC label within it.

Rule 2: For each VERB-type functional component, draw a line between the NOUN that precedes and the NOUN that follows the VERB, taking into account: i) if the VERB is "to be or any of its conjugations", draw a FTOBE graphical element from the NOUN that precedes the VERB to the NOUN that immediately follows the VERB; ii) if the VERB is any other transitive verb, draw a FERBLE graphical element from the NOUN that precedes the VERB to the NOUN that immediately follows the VERB; iii) if the VERB is not transitive, draw a FVERB graphical element from the NOUN that precedes the VERB to that same NOUN.

Rule 3: For each PREP-type functional component, but only for the prepositions "of" and "of the", draw a FPREP graphical element between the NOUN that precedes the preposition and the NOUN that follows the preposition.

Rule 4: For each transitive verb, draw the graphical components that correspond to the words created based on the MAS Metamodel defined in Substage A1: a FERBLE graphical element for the Performer word, a FERBLE for the Performable word, and a FPERF for the Performance word.

The Processor 150 displays the Functional Architecture documents on the Input/Output Device 120.

Stage G. Identifying and Storing the Design Components.

In the present invention, a design document of "the case" is composed of the following diagrams: Conceptual design diagrams, Use case diagrams, Class diagrams, Entity relationship diagrams, Screen design diagrams, and Report design diagrams.

Each design document of "the case" displays graphics. Specifically, Class diagrams are used in the present invention. Each graphical element that is part of the class diagram according to the Object Orientation (OO) paradigm will be called a design component (DC). Example: class relationship, attribute, method.

For the purposes of the present invention, it should be understood that class, attribute, relationship and method are design components as defined in the Object Orientation (OO) paradigm.

In this stage (FIG. 4G), the Processor 150, configured as an Automatic Software Designer 152, automatically designs the software by means of the following substages:

Substage G1. Group Functional Components, Create their Classes and Inheritance Relationships.

In this substage, the Processor 150, configured as an Automatic Software Designer 152, creates the classes and inheritance relationships, based on the similarity of their attributes, carrying out the following actions:

(a) Selecting Functional Components

It takes the list of functional components created in Stage D, which are stored in the logical structure of Functional Components 172 of the Dynamic Database Memory 170, except for the functional components tagged as "Is attribute" and those of the VERB Word Type.

It deletes the functional components that have very similar names (for example, 90% similarity using the Levenshtein Distance algorithm), as is the case for the words 'person' and 'persons', in which 'Person' is considered a single functional component.

(b) Grouping Similar Functional Components

It groups the functional components included in the previous step using {list of &attributes}, by placing functional components that have the same {list of &attributes} in the same group. It takes those groups that have more than one functional component and assigns them a word name, for example, Word01, Word02.

(c) Creating Classes by Group

It creates a class for each Group that has more than one functional component, indicating each element of the {list of &attributes} as an attribute, and assigning to the class the name of the word that corresponds to the group.

(d) Creating Inheritance Relationships for Groups

For those functional components that belong to the groups with more than one element, it creates an inheritance relationship between each class that the functional component belongs to and its respective group class, depending on the {list of &attributes} group to which it belongs. That is, the inheritance relationship exists between classes that have the same {list of &attributes} generalized in the same group class from the previous step.

Substage G2. Creating Formula Classes Based on FX- and CC-Type Steps

In this substage, the Processor 150, configured as an Automatic Software Designer 152, performs the following actions on the simple sentences of "the case", divided by question type:

(a) Listing VERB and DO Functional Components that Belong to FX and CC Steps

It lists all VERB- and DO-type functional components and identifies their corresponding step type, as defined in Substage C3.

(b) Creating Classes for FX- and CC-Type Steps

Based on the functional components that belong to FX- and CC-type steps, it creates classes with behavior defined by the VERB. For each VERB, it creates a class and adds a method, called formula, which is responsible for computing the expression indicated by {fx expression}.

For each class created in the previous step, it performs the following actions:

a. If the DO "Is Attribute", it creates an attribute called DO in the class.

b. If the DO "Is [not] Attribute", it creates a relationship between the class from the previous step and the class that contains DO as its attribute (called TargetClass). It names this relationship TargetClass Movement.

Substage G3. Creating Domain Classes Based on QS-Type Steps

In this substage, the Processor 150, configured as an Automatic Software Designer 152, performs the following actions:

(a) Listing VERB and DO Functional Components that Belong to QS Steps

It lists all VERB- and DO-type functional components and identifies their corresponding step type, as defined in Substage C3.

(b) Creating Classes for QS-Type Steps

Based on the functional components that belong to the QS-type steps, it creates classes with behavior defined by the VERB. For each VERB, it creates a class called VERB+DO, and adds a method called fxdomain, which is responsible for searching for data as defined by {fx expression}. It creates a class called "Domain"+VERB+DO with the &attributes indicated in {list of &attributes}. If the list of &attributes matches the &attributes of one of the classes created previously, it creates an inheritance relationship between them in the corresponding direction.

The fxdomain method calls upon the "Domain"+VERB+DO.

Substage G4. Creating Domain Classes Based on L-Type Steps

In this substage, the Processor 150, configured as an Automatic Software Designer 152, carries out the following actions:

(a) Listing VERB and DO Functional Components that Belong to L-Type Steps

It lists all VERB- and DO-type functional components and identifies their corresponding step type, as defined in Substage C3.

(b) Creating Classes for L Step Types

Based on the L-type functional components, it creates a relationship between DO and NOUN called DO+"for"+NOUN.

Substage G5. Creating Operation Classes Based on F-Type Steps

In this substage, Processor 150, configured as an Automatic Software Designer 152, carries out the following actions:

(a) Listing VERB and DO Functional Components that Belong to F Steps

It lists all VERB- and DO-type functional components and identifies their corresponding step type, as defined in Substage C3.

(b) Creating Classes for F-Type Steps

Based on the F-type functional components, it creates the following classes depending on whether or not the DO "Is Attribute":

a. If the DO "Is Attribute": it does not create a class.
b. If the DO "Is [not] Attribute":
  i. it creates a class called: VERB+DO, which will be called Class_Cab
  ii. The DO class from the F-type step will be called Class_Rec
  iii. It creates a 1 to n relationship between the Class_cab and the Class_rec. It names the relationship "Movement"+DO.

Substage G6. Applying Morphosyntactic Rules to Design Components

In one embodiment of the invention, the user can enable the use of Morphosyntactic rules, so that the Processor 150 complies with the logic defined in Substage A2.

Based on the Morphosyntactic Rules defined in Substage A2 and stored in the logical structure of Languages, Words, and Morphosyntactic Rules 162 of the Static Database Memory 160, the Processor 150 determines which software design components (DC) are derived from each functional component (FC) stored in the Functional Components logical structure 172 of the Dynamic Database Memory 172.

It lists the questions, and creates the rule identifier for each question based on the types of words that make up the answer. It then searches for said rule identifier in the logical structure of Languages, Words, and Morphosyntactic Rules 162 of the Static Database Memory 160, and locates the Base Rule by matching the identifier. There may be more than one Morphosyntactic rule with the same Base Rule identifier, in which case the rule that matches the Question, the F step type and the specific word(s) found in the text and indicated in the Morphosyntactic rule is selected. In the case that the identifier does not match any base rule, the Processor 150 ignores the question.

In this embodiment, for each transitive VERB identified in the previous substages and as defined in Substage A1, the Processor 150 creates a Word 161-4 associated with the verb and the Performer 161-2 and Performable 161-3 words.

For the case of an L-type step, the user can create a Morphosyntactic rule dependent on the Base Rule VERB-NOUN-PREP-NOUN, in which the verb "to link", for example, is treated as a specific word. In this case the step type would be L and the Processor 150 would create a relationship between DO and NOUN called DO+"for"+NOUN.

For the case of FX- and CC-type steps, the Processor 150 creates a Word 161-4 associated with the verb and the Performer 161-2 and Performable 161-3 words. The Processor 150 adds the method called fxdomain to the Performer 161-2 word.

FIG. 4A3 shows a software design class model with an application example that describes the Morphosyntactic Rules for Software design based on the MAS Metamodel 161. These Morphosyntactic rules give rise to the modeling of the sentences of "the case". In order to design software from natural language, Morphosyntactic Rules for Software design are defined for each of the questions that describe a simple sentence (When, Who, What, How, Where). These rules, stored in the Words, Rules and Morphosyntactic Rules Static Database Memory 162, are compared with the rule identifier computed for each simple sentence, as indicated in Substage 2A, and based on matching, the logic used by the Processor 150, configured as an Automatic Software Designer 152, to generate software design components, is defined.

Stage H. Defining Formats, Graphical Notation and STD Sentences

In this stage (FIG. 4H), formats for the Business, Analysis and Design documents, and the parameters necessary to generate them, are defined by means of the following steps:

Substage H1. Defining the Output Formats for the Documents

In this substage, using the Formats, Graphical Notation and STD Sentences User Interface 123 of the Input/Output Device 120, the display or printing formats for the business documents, analysis documents, and design documents are defined.

These definitions include defining margins, fonts, and the secuence sort order in which the content of each document will be displayed.

For the business documents, the presentation order and the sequence of the layers, resources, processes, subprocesses, moments and steps are defined.

For the analysis documents, the presentation order and the sequence of the global and detailed requirements are defined.

In one embodiment of the invention, it is possible for a user to modify the formats, graphical notations and standard sentences uploaded in Substages F1, F2, F3 and F4, using the Formats, Graphical Notation and STD Sentences User Interface 123 of the Input/Output Device 120.

Substage H2. Defining the Standard Sentences for the Requirements

In this substage, using the Formats, Graphical Notation and STD Sentences User Interface 123 of the Input/Output Device 120, the standard sentences for describing requirements are entered, written in the language or languages that will be used to generate the requirements, and they are stored in the logical structure of Languages, Words and Morphosyntactic Rules 162 of the Input/Output Device 160. The standard sentences necessary to generate the requirements are described below: These sentences must be translated and stored in each of the languages for which document requirement generation is desired.

(a) Standard Sentences for Global Requirements:

To generate the Global Requirements, the following standard sentences are defined, which apply to the English language:

OracionSTD_abm_Sust: "Create, Read, Update and Delete"

OracionSTD_abm_Pers: "Create, Read, Update and Delete Entities with role"

OracionSTD_verbo_F: "Create transaction record"
OracionSTD_verbo_R: "Create rule that"
OracionSTD_verbo_conector_R: "with"
OracionSTD_verbo: "Create rule that"

(b) Standard Sentences for Detailed Requirements for NOUN and DO Components

To generate the detailed requirements for NOUN and DO functional components, the following standard sentences are defined, which apply to the English language:

OracionSTD_Crear: "Create a new element"
OracionSTD_Agregar_Atributos: OracionSTD_Agregar_Atributos
OracionSTD_Agregar_Controles: "Perform the following controls when an element is created"
OracionSTD_Baja: "Exclude a"
OracionSTD_Edicion: "Update a"
OracionSTD_Consulta: "Search the transaction records of"
OracionSTD_complemento_control: "performing the following controls"
OracionSTD_complement_búsqueda: "performing the following searches"
OracionSTD_crear_atributo: "Create the attribute"
OracionSTD_validacion_atributo: "Perform the following controls when the datum is completed"

(c) Standard Sentences for Detailed Requirements for PERSON Components

To generate the detailed requirements for PERSON functional components, the following standard sentences are defined, which apply to the English language:

OracionSTD_permitirque: "Allow"
OracionSTD_acciones_Persona: "to perform the following actions"
OracionSTD_afectacion_Persona: "to be subject to the following actions"
OracionSTD_responsabilidad_Persona: "to be performed under the responsibility of"

(d) Standard Sentences for Detailed Requirements for VERB Components

To generate the detailed requirements for VERB functional components associated with CC-type steps or FX-type steps, the following standard sentences are defined, which apply to the English language:

OracionSTD_crear_Fx: "Create a formula for"
OracionSTD_argumentos: "using the following data as arguments"
OracionSTD_expresion: "in the following expression"
OracionSTD_msj_error_Fx: "If the formula returns an error, display the following message"
OracionSTD_msj_ok_Fx: "If the formula returns a valid result, display the following message"
OracionSTD_msj_advertencia_Fx: "If the formula returns a warning, display the following message"

To generate the detailed requirements for VERB functional components associated with QS-type steps, the following standard sentences are defined, which apply to the English language:

OracionSTD_crear_busqueda: "Create a rule for"
OracionSTD_exponer_atributos: "displaying the following data"
OracionSTD_definir_búsqueda: "Allow searching for the data of"
OracionSTD_conector_orden: "by"
OracionSTD_definir_filtro: "Allow filtering the data of"
OracionSTD_definir_orden: "Allow sorting the data of"
OracionSTD_definir_agrupamiento: "Allow grouping for the data of"
OracionSTD_definir_total: "Display the following summarized data"

To generate the detailed requirements for VERB functional components associated with L-type steps, the following standard sentences are defined, which apply to the English language:

OracionSTD_crear_regla: "Create a rule that"
OracionSTD_condicion: "as long as the following condition is met"
OracionSTD_vincular: "Link"
OracionSTD_conector_vincular: "with"
OracionSTD_complemento_control: "performing the following controls"
OracionSTD_des_vincular: "Unlink"
OracionSTD_consultar: "Search"
OracionSTD_complemento_relacionar: "in a relationship with"
OracionSTD_complemento_criteriobusqueda: "using the following search criteria"

To generate the detailed requirements for VERB functional components associated with F-type steps, the following standard sentences are defined, which apply to the English language:

OracionSTD_permitir: "Allow"
OracionSTD_habilitar_persona: "Enable"
OracionSTD_complemento_accionpersona: "to decide on the action"
OracionSTD_movimientos: "Allow the movements of"
OracionSTD_complemento_acargode: "to affect"
OracionSTD_control_nuevo: "Perform the following controls when creating a new transaction record of"
OracionSTD_control_eliminar: "Perform the following controls when deleting the transaction record of"
OracionSTD_control_modificar: "Perform the following controls when updating the transaction record of"
OracionSTD_precedencia: "based on the following existing records:"
OracionSTD_nuevo_movimiento: "Record n movements of"
OracionSTD_control_nuevo_movimiento: "Perform the following controls when creating a new movement of"
OracionSTD_control_eliminar_movimiento: "Perform the following controls when deleting the movement of"
OracionSTD_control_modificar_movimiento: "Perform the following controls when updating the movement of"
OracionSTD_buscar_elemento: "Search for the elements of"
OracionSTD_complemento_buscarelemento: "to create a movement, performing the following searches"

Substage H3. Defining the Graphical Notation to be Used in the Software Design

In this stage, the graphical notation to be used in the software design diagrams is defined, using the Formats, Graphical Notation and STD Sentences User Interface 123 of the Input/Output Device 120.

The design diagrams can be displayed in various graphical notations, one of them being UML notation, but it is possible to define graphical elements to represent the design documents.

Substage H4. Defining the Graphical Notation Associated with the MAS Metamodel

Indicating the graphical component to be used in the Software design diagram for each element of the MAS Metamodel defined in Substage A1. In this way, the user enters the graphical notations in the visual grid that is displayed by the Formats, Graphical Notation, and STD Sentences User Interface 123.

The design diagrams can be displayed in various graphical notations, one of them being UML notation, but it is possible to define graphical elements to represent the design documents, as that shown in FIG. 7.

Stage I. Automatically Generating Business, Analysis and Design Documents

In this stage (FIG. 4I), the Processor 150, configured as a Document Generator 153, generates the business, analysis and design documents, using the formats and notations stored in the Formats, Graphical Notations and STD Sentences 163 of the Static Database Memory 160, and displays them in the Document Display User Interface 124 of the Input/Output Device 120, by means of the following substages:

Substage I1. Generating Business Documents

In this stage, the Processor 150, configured as a Document Generator 153, composes the text in a business document. In the present invention, a business document is an analysis document that shows the simple sentences stored in the logical structure of Simple Sentences and Questions 171 of the Dynamic Database Memory 170, by performing the following actions:

a). Ordering Dimensions, Temporal Activities and Simple Sentences

It orders the texts hierarchically, with layers at the top of the hierarchy and steps at the bottom of the hierarchy, as shown in FIG. 4I2, thus:

Layers 310 contain resources 320

Resources 320 contain processes 330

Processes 330 contain subprocesses 340

Subprocesses 340 contain moments 350

Moments 350 contain steps 360 that can be of up to five types, as explained previously.

Steps 360 contain simple sentences 370 with their corresponding completed questions.

b). Consecutively Joining the Previously Ordered Components

In a preferred embodiment (FIG. 5), the simple sentence is obtained by joining the answers to each of the questions in the preferred order, thus: When, then Who, then What, then How, and lastly Where, which does not mean the order cannot be changed.

When all of the processes are described using this method, a complete and detailed composition of "the case" expressed in natural language is achieved.

Substage I2. Generating Analysis Documents

In this stage, the Processor 150, configured as a Document Generator 153, structures the functional requirements and automatically generates Analysis documents. In the present invention, an Analysis document shows the Requirements obtained from the functional components stored in the logical structure of Simple Sentences and Questions 172 of the Dynamic Database Memory 170, by performing the following actions:

a) Assembling Global Functional Requirements

The functional global requirements of "the case" are those actions that describe the process in the order in which they must be performed so that they can be interpreted and the action to be performed can be determined, from the point of view of the functional requirements needed to construct a software application.

The Processor 150 takes the functional components stored in the Functional Components logical structure 172 of the Dynamic Database Memory 170, and selects only the following: NOUN, PERSON, DO and VERB. For each of the aforementioned functional components, it generates a global requirement that is part of the scope of "the case", defining the global requirements for NOUN components (NOUN, DO, PER) and defining global requirements for VERB components.

Global Requirements for NOUN Components

The Global requirement is assembled for each noun functional component (NOUN, PERSON and DO), as long as it is not an attribute, by creating a tagged and sequentially numbered sentence, such as the sentence shown in Table 1, using the standard sentences defined in Substage F2.

TABLE 1

| Functional component | Mode of assembly of Global requirement |
|---|---|
| PERSON | "Create, Read, Update and Delete Entities with role" + PERSON |
|  | Example: Create, Read, Update and Delete Entities with role 'system operator' |
| NOUN | "Create, Read, Update and Delete" + NOUN |
|  | Example: Create, Read, Update and Delete + 'person registry' |
| DO | "Create, Read, Update and Delete" + DO |
|  | Example: Create, Read, Update and Delete 'document number' |

Global Requirements for VERB Components

The Global requirement is assembled for each VERB functional component by creating a tagged and sequentially numbered sentence In this case, the sentence is generated for each step type, based on the VERB, and uses the DO and the NOUN that are coupled to it in the What question, as shown in Table 3, to compose it:

TABLE 2

| Functional component | Step type | Mode of assembly of Global requirement |
|---|---|---|
| VERB | CC | "Create rule that" + VERB + DO |
| VERB | QS | "Create rule that" + VERB + DO |
| VERB | FX | "Create rule that" + VERB + DO |
| VERB | L | "Create rule that" + VERB + DO + "with" + NOUN |
| VERB | F | "Create transaction record" + DO |

A single Global requirement is written from different steps and through a single functional component. In this case, the Global requirement is written only once to avoid repetition and it is linked to the corresponding steps as much times as necessary.

b) Assembling Detailed Functional Requirements

In this stage, the detailed requirements of "the case" are described for each Global requirement: the explicit detailed requirements, which are those clearly denoted in the sentences, as well as the implicit detailed requirements, which are those that are known to be necessary, but are not described explicitly.

In the context of the present invention, the sentences shown in quotation marks are the preferred sentences, taken from the logical structure of Languages, Words and Morphosyntactic Rules 162 of the Static Database Memory 160. However, these sentences can be replaced by sentences that have equivalent meaning and are suitable for the language chosen for the case, in the embodiment presented in Substage F2.

For each type of functional component, based on the definition of its Global Requirement, the detailed requirements of "the case" are defined using the standard sentences defined in Substage F2.

For a better understanding of the present invention, it should be noted that in order to generate the detailed requirements, the words are substituted in accordance with the following criteria:

NOUN refers to the functional components of this type defined in Substage D2.

PERSON refers to the functional components of this type defined in Substage D2.

DO refers to the functional components of this type defined in Substage D2.

VERB refers to the functional components of this type defined in Substage D2.

{list of &attributes}: the list of &attributes that describe NOUN, made up of the NOUNS that were marked as &attributes in Substage D2, plus those added in Substage D3.

{list of *attributes}: part of the list of &attributes defined in Substage D2 that is used to search, filter, sort, group or add the results of a search or query.

{list of DO &attributes}: the collection so &attributes from the list of &attributes defined in Substage D2, made up of the elements that are associated with the DO component through the detailed requirements created in Substage G3.

{list of NOUN &attributes}: the collection so &attributes from the list of &attributes defined in Substage D2, made up of the elements that are associated with the NOUN component through the detailed requirements created in Substage G3.

{list of PERSON &attributes}: the collection so &attributes from the list of &attributes defined in Substage D2, made up of the elements that are associated with the PERSON component through the detailed requirements created in Substage G3.

{list of CC-type global requirements}: the collection of global requirements, made up of the global requirements that were defined based on the NOUN component or the DO component belonging to CC-type steps identified in Substage E2. This list contains from 0 to n global requirements. If the list contains 0 global requirements, the detailed requirements that refer to CC-type global requirements are not generated.

{list of QS-type global requirements}: a list of global requirements generated based on the QS-type steps identified in Substage E3. This list contains from 0 to n global requirements. If the list contains 0 global requirements, the detailed requirements that refer to QS-type global requirements are not generated.

{list of F-type global requirements}: a list of global requirements generated based on the F-type steps identified in Substage E5. This list contains from 0 to n global requirements. If the list contains 0 global requirements, the detailed requirements that refer to F-type global requirements are not generated.

{fx expression}: the expression for the formula that takes the listed data as arguments and was stated in Substage D3.

{error message}: the text of the message that is to be shown in the system if there is an error in executing the formula, which was defined in Substage D3.

{ok message}: the text of the message that is to be shown in the system if the result of a check or confirmation is correct, which was defined in Substage D3.

{warning message}: the text of the message that is to be shown in the system if the result of a check or confirmation is NOT correct, which was defined in Substage D3.

Defining Detailed Requirements for NOUN Components

Based on the NOUN-type functional components stored in the logical structure of Functional Components 172 of the Dynamic Database Memory 170, and their respective Global requirement, the following detailed requirements are generated:

| Functional Component | Global requirement |
|---|---|
| NOUN | "Create, Read, Update and Delete" + {NOUN} |
| Detailed requirements: | |
| For each NOUN-type functional component, the following sentences that constitute the detailed requirements are written, if the NOUN is not marked as an attribute: | |
| 1. OracionSTD_Crear+ NOUN + OracionSTD_Agregar_Atributos + {list of &attributes} | |
| 2. OracionSTD_Agregar_Controles+ NOUN + {list of CC-type global requirements} | |
| 3. OracionSTD_Baja+ NOUN + OracionSTD_complemento_control + {list of CC-type global requirements} | |
| 4. OracionSTD_Edicion + NOUN+ "Performing the following controls" + {list of CC-type global requirements} | |
| 5. OracionSTD_Consulta + NOUN+ OracionSTD_complemento_búsqueda+{list of QS-type global requirements} | |
| If the NOUN is marked as an attribute, the following requirements are defined: | |
| 1. OracionSTD_crear_atributo + NOUN | |
| 2. OracionSTD_validacion_atributo + NOUN+ {list of CC-type global requirements} | |

Defining Detailed Requirements for PERSON Components

Based on the PERSON-type functional components stored in the logical structure of Functional Components 172 of the Dynamic Database Memory 170, and their respective Global requirement, the following detailed requirements are generated:

| Functional Component | Global Requirement |
| --- | --- |
| PERSON | "Create, Read, Update and Delete Entities with role" + PERSON |

Detailed requirements:
For each PERSON-type functional component, the following detailed requirements are written:
1. OracionSTD_Crear + PERSON + OracionSTD_Agregar_Atributos + {list of &attributes}
2. OracionSTD_Agregar_Atributos + PERSON + {list of CC-type global requirements}
3. OracionSTD_Baja + PERSON + OracionSTD_complemento_control + {list of CC-type global requirements}
4. OracionSTD_Edicion + PERSON + OracionSTD_complemento_control + {list of CC-type global requirements}
5. OracionSTD_permitirque + PERSON + OracionSTD_acciones_Persona + {list of F-type global requirements}
6. OracionSTD_permitirque + PERSON + OracionSTD_afectacion_Persona + {list of F-type global requirements}
7. OracionSTD_permitirque + {list of F -type global requirements }+ OracionSTD_responsabilidad_Persona + PERSON
8. OracionSTD_Consulta + PERSON + OracionSTD_complemento_criteriobusqueda:+ {list of QS-type global requirements}

Defining Detailed Requirements for VERB Components Based on the VERB-type functional components stored in the logical structure of Functional Components 172 of the Dynamic Database Memory 170, and their respective Global requirement, the following detailed requirements are generated:

| Functional Component | Global Requirement |
| --- | --- |
| VERB (CC step type) | "Create rule that" + VERB + DO |

Detailed requirements:
For each VERB-type functional component that participates in a CC-type step, the following detailed requirements are defined:
1. OracionSTD_crear_Fx+ VERB + DO + OracionSTD_argumentos + {list of &attributes} + OracionSTD_expresion + {fx expression}
2. OracionSTD_msj_error_Fx+ {error message}
3. OracionSTD_msj_ok_Fx + {ok message}
4. OracionSTD_msj_advertencia_Fx+ {warning message}

| VERB (QS step type) | "Create rule that" + VERB + DO |
| --- | --- |

Detailed requirements:
For each VERB-type functional component (QS-type step), the following detailed requirements are defined:
1. OracionSTD_crear_busqueda + VERB + DO + OracionSTD_exponer_atributos + {list of &attributes}
2. OracionSTD_definir_búsqueda + DO + OracionSTD_conector_orden+ {list of *attributes}
3. OracionSTD_definir_filtro+ DO + OracionSTD_conector_orden+ {list of *attributes}
4. OracionSTD_definir_orden+ DO + OracionSTD_conector_orden+ {list of *attributes}
5. OracionSTD_definir_agrupamiento+ DO + OracionSTD_conector_orden+ {list of *attributes }
6. OracionSTD_definir_total+ {list of *attributes}

| VERB (FX step type) | "Create rule that" + VERB + DO |
| --- | --- |

Detailed requirements:
For each VERB-type functional component that participates in a CC-type step, the following detailed requirements are defined:
1. OracionSTD_crear_Fx+ VERB + DO + OracionSTD_argumentos + {list of &attributes} + OracionSTD_expresion + {fx expression}
2. OracionSTD_msj_error_Fx+ {error message}
3. OracionSTD_msj_ok_Fx + {ok message}
4. OracionSTD_msj_advertencia_Fx+ {warning message}

| VERB (L step type) | "Create rule that" + VERB + DO + "with" + NOUN |
| --- | --- |

Detailed requirements:
For each VERB-type functional component (L-type step), the following detailed requirements are defined:
1. OracionSTD_crear_regla + VERB + DO + "with" + NOUN + OracionSTD_condicion + {list of DO &attributes} + {fx expression} + {list of NOUN &atributos}
2. OracionSTD_vincular + DO + OracionSTD_conector_vincular + NOUN + OracionSTD_complemento_control + {list of CC-type global requirements}
3. OracionSTD_desvincular+ DO + "with" + NOUN + OracionSTD_complemento_control + {list of CC-type global requirements}
4. OracionSTD_ consultar+ DO + OracionSTD_ complemento_relacionar+ NOUN + OracionSTD_ complemento_criteriobusqueda+{list of QS-type global requirements}

| VERB (F step type) | "Create transaction record" + DO |
| --- | --- |

Detailed requirements:
For each VERB-type functional component (F-type step), the following detailed requirements are defined, if DO is not marked as an attribute:
For each VERB-type functional component (F-type step), the following detailed requirements are defined:

| Functional Component | Global Requirement |
| --- | --- |

1. OracionSTD_permitir + VERB + DO + OracionSTD_Agregar_Atributos + {list of &attributes}
2. OracionSTD_habilitar_persona+ {list of PERSON} + OracionSTD_complemento_accionpersona+ VERB + DO
3. OracionSTD_movimientos+DO + OracionSTD_complemento_acargode+ {list of PERSON}
4. OracionSTD_control_nuevo+ DO +": "+ {list of CC-type global requirements}
5. OracionSTD_control_eliminar+ DO +": "+ {list of CC-type global requirements}
6. OracionSTD_control_modificar + DO + OracionSTD_complemento_control + {list of CC-type global requirements}
7. OracionSTD_permitir + VERB + DO + OracionSTD_precedencia+{list of F-type global requirements}
8. OracionSTD_nuevo_movimiento + DO
9. OracionSTD_control_nuevo_movimiento + DO + {list of CC-type global requirements}
10. OracionSTD_control_eliminar_movimiento+ DO + OracionSTD_complemento_control + {list of CC-type global requirements}
11. OracionSTD_control_modificar_movimiento + DO + OracionSTD_complemento_control + {list of CC-type global requirements}
12. OracionSTD_buscar_elemento + DO + OracionSTD_complemento_buscarelemento +{list of QS-type global requirements}

Defining Detailed Requirements for DO Components

Based on the DO-type functional components stored in the logical structure of Functional Components 172 of the Dynamic Database Memory 170, and their respective Global requirement, the following detailed requirements are generated:

| Functional Component | Global Requirement |
| --- | --- |
| DO | "Create, Read, Update and Delete" + DO |

Detailed requirements:
For each NOUN-type functional component, the following sentences that constitute the detailed requirements are written, if the NOUN is not marked as an attribute:
1. OracionSTD_Crear+ NOUN + OracionSTD_Agregar_Atributos + {list of &attributes}
2. OracionSTD_Agregar_Atributos + NOUN + {list of CC-type global requirements}
3. OracionSTD_Baja+ NOUN + OracionSTD_complemento_control + {list of CC-type global requirements}
4. OracionSTD_Edicion + NOUN + OracionSTD_complemento_control + {list of CC-type global requirements}
5. OracionSTD_Edicion + NOUN + "Performing the following searches" + {list of QS-type global requirements}
If the DO is marked as an attribute, the following requirements are defined:
1. OracionSTD_crear_atributo + DO
2. OracionSTD_validacion_atributo + DO + {list of CC-type global requirements}

Substage I3. Generating Software Design Documents

As per the graphical notation defined in Substage F4, the Processor 150, configured as a Document Generator 153, generates an XML file in which the name of each design component and its corresponding graphical notation code are stored between tags.

For the embodiment of the invention in which UML graphical notation is chosen, the xmi standard is used and the XML that represents the class diagram is generated.

The Processor 150, configured as a Document Generator 153, generates the design documents, taking the data stored in the database memory that corresponds to the design, and exporting the content in a specific XML format, according to the definition of the graphical notation chosen in Substage F4.

7. EXAMPLE OF ONE APPLICATION OF THE METHOD

Based on a description of a process in natural language, the system automatically produces Business documents, Analysis documents and Design documents of "the case".

The components of the system are those that enable the production of the aforementioned documents (FIG. 3:
1. Input/Output device 120: the device through which the texts in natural language are entered, using the following configurations:
   a. Language User Interface 121.
   b. Case User Interface 122.
   c. Formats, Graphical Notations and STD Sentences User Interface 123
   d. Document Display User Interface 124
2. CPU 110: the processing device of the system 100, composed of:
   a. Main Memory 140: It performs the following functions according to its configuration:
      i. Diagrams 141.
      ii. Sentence Matrix 142:
      iii. FC Matrix 143:
      iv. DC Matrix 144:
   b. Processor 150: It carries out the following functions depending its configuration:

i. Automatic Sentence Analyzer 151
ii. Automatic Software Designer 152
iii. Document Generator 153
3. Database Memory 130:
   a. Static Database Memory 160:
      i. MAS Metamodel 161.
      ii. Languages, Words and Morphosyntactic Rules 162.
      iii. Formats, Graphical Notations and STD Sentences 163.
   b. Dynamic Database Memory 170
      i. Simple Sentences Questions 171
      ii. Functional Components 172
      iii. Design Components 173

Input/Output Device

This tool is made up of permanent memories that are capable of producing screens on a monitor, with fields in which the user can enter data or perform actions.

Case User Interface 122

The Case User Interface allows the user to enter the requested data and perform actions to save them in the database memory.

In order for the tool to function, the user must enter data in natural language (layers, resources, processes, subprocesses, moments, steps) as established by the method.

To that end, it presents this upload interface that allows the user to enter these fields and create relationships between them using the order established in the method, wherein each of the components (dimensions, temporal activities and simple sentences) require the following data fields to be uploaded:

Name
Description
Related dependent elements

These data fields are displayed in the Dimensions and Temporal Activities Upload Interface, in which the {text1} and {text2} are replaced by the name of the corresponding component, as the user fills in the data fields in the established sequence:

First, {text1}="Layer" and {text2}="Resource"
When the Edit action is executed, the Dimensions and Temporal Activities Upload Interface is displayed again, but this time, {text1}="Resource" and {text2}="Process"
When the Edit action is executed, the Dimensions and Temporal Activities Upload Interface is displayed again, but this time, {text1}="Process" and {text2}="Subprocess"
When the Edit action is executed, the Dimensions and Temporal Activities Upload Interface is displayed again, but this time, {text1}="Subprocess" and {text2}="Moment"

When the Edit action is executed, the interface Dimensions and Temporal Activities Upload Interface is displayed again, but this time, {text1}="Moment" and {text2}="Step" Once the step is completed, the interface Sentence Interface is displayed, in which the user must answer the questions in order to create the complete, structured simple sentence structured as defined in the method. The user must also choose one of the following options from the Step Type list:

F: Functional
CC: Check/Control
QS: Query/Search
FX: Calculation
L: Link

As the user answers the questions, the tool completes the Sentence, concatenating the text entered in the questions, in the order that the interface displays them. Once the data upload task is completed, the user can perform the following actions:

Save: save the uploaded data in the Database Memory.
Cancel: discard the uploaded data in the Database Memory.

Analysis Display

The analysis display that is displayed on the monitor consists of screens that display the uploaded data organized in such a way that the user of the tool is able to read and comprehend "the case", guiding the user to perform an accurate analysis for proper generation of Global and Detailed functional requirements. These requirements are generated automatically by the tool, by prompting the user to confirm and select some data.

Word Analysis Display

This interface presents the user with the simple sentences, in structured form (Word Analysis Interface). Using this interface, the tool enables the user to execute the Analysis Processor and the Analysis Document Processor.

The user is presented with a table with the entirety of the uploaded simple sentences, and the user can execute the Analyze action for each of them. This action engages the Analysis Processor, which returns the list of words contained in the sentence as a result.

Each word is characterized by:
Word: the word detected by the Analysis Processor.
Word: the question to which the word belongs within the sentence: When, Who, What, How, Where.
Component Type: the type that the Analysis Processor automatically assigns to each word: NOUN, ADV, VERB, DO, ADJ
In Scope: the column that allows the user of the tool to mark whether the word in question will be part of the scope of "the case" to be designed, if so desired. The user can choose from among the following options: YES/NO
Is Attribute: the column that allows the user of the tool to indicate whether the word in question should behave like an &attribute, if so desired. The user can choose from among the following options: YES/NO Once the word analysis task is completed, the user can perform the following actions:
Save: save the uploaded data in the Database Memory.
Cancel: discard the uploaded data in the Database Memory.

In this interface, it is possible to execute the Analyze action for each word identified by the Analysis Processor. In such case, the Analysis Document Processor is executed and then the Requirement Analysis Display is displayed.

Requirement Analysis Display

This interface Requirement Analysis Display presents the user with the Global and Detailed requirements generated by the Analysis Document Processor.

The user is presented with a table with the totality of the generated Global requirements, and a nested table with the Detailed Requirements that correspond to each Global Requirement.

Each global requirement is characterized by:
Word: the word detected by the Analysis Processor.
Component Type: the type that the Analysis Processor automatically assigns to each word: NOUN, ADV, VERB, DO, ADJ
Step Type: the value chosen in the upload interface by the user.
GlobalReqNum: a correlative number generated by the tool.

Global Requirement: the sentence, produced by the Analysis Processor, that corresponds to the global requirement.

Each detailed requirement is characterized by:

DetReqNum: a correlative number generated by the tool.

Detailed Requirement: the sentence, produced by the Analysis Processor, that corresponds to the detailed requirement.

&Attributes: the list of &attributes that describe the Word. They must be chosen by the user from a list produced by:

Manual user entry

Automatic generation, for words flagged as "Is Attribute" by the user.

Message: the list of messages that the user wishes to specify as responses to error, correct action and incorrect action situations as a result of requirement execution. This list can be generated by:

Manual entry by the user.

Expression: the expression to be calculated that the user specifies for Step Types=CC or FX.

Associated GlobalReq: the list of global requirements that allow the user to reference a GlobalReq from this list and associate it with a detailed requirement. This occurs when the description of the scope does not include the description of some feature of this kind (which prevents the system from generating the relationship automatically), in which case, the user adds it.

Once the word analysis task is completed, the user can perform the following actions:

Save: save the uploaded data in the Database Memory.

Cancel: discard the uploaded data in the Database Memory.

Design Display

This interface presents the user with the words detected by the Analysis Processor, to enable the design of "the case" based on the results of the analysis.

The user is presented with a table with the totality of the analyzed words, each of which has a nested table containing its related words based on the Associated Requirements.

Each word is characterized by the following data derived from the analysis phase:

Word: a word that is included in the scope to be designed.

Word: the question to which the word belongs within the sentence: When, Who, What, How, Where.

Component Type: the type that the Analysis Processor assigns to each word: NOUN, ADV, VERB, DO, ADJ Step Type: the value chosen in the upload interface by the user.

Is &attribute: feature indicated by the user in the analysis phase; it can be YES or NO.

In this interface, it is possible to execute the Design action for each of the listed words. In such case, the Design Processor is executed and then the design display, with the list of classes generated for the word and its related words, is displayed.

Each class is characterized by:

Class: Name of the class designed by the Design Processor.

ClassType: It can be L or NonL.

&Attributes: The list of &attributes assigned to the class. They belong to the list of &attributes states in the analysis phase, in all cases.

Methods: The list of methods assigned to the class. These methods are generated by the Design Processor.

Once the classes are designed, it is possible to execute the See Diagram action, which will present the class diagram. Example class diagram, on the screen.

Once the word analysis task is completed, the user can perform the following actions:

Save: save the uploaded data in the Database Memory.

Cancel: discard the uploaded data in the Database Memory.

Main Memory

Processor

In order to automatically produce the analysis and design documents of "the case", the tool provides a processor with three functionalities: analysis processing that executes the analysis action, design processing that executes the design action, and document processing that produces the resulting documents.

Automatic Sentence Analyzer

The Analysis Processor takes the collection of complete simple sentences uploaded to the Database Memory by the user. Based on said sentences, it executes three algorithms:

The algorithm (FIG. 4E1) that identifies the words relevant to the construction of "the case", a constituent method of the present invention described in Stage E.

The algorithm that generates the global requirements of "the case", a constituent method of the present invention described in Stage F. Substage 1.

The algorithm that generates the detailed requirements of "the case", a constituent method of the present invention described in Stage F. Substage 2.

Word Algorithm

This algorithm (FIG. 4E1) executes the described routine for each existing sentence and requires that the following two lists be uploaded into the database:

GRW={grouping words} The collection of words that establish a grouping, for example: the word "of" is a grouping word when it is present in "list of prices"

PEX={excluded words} The collection of words that are to be excluded from the analysis. It is normally composed of the prepositions, conjunctions and articles.

Once this algorithm is executed, all of the words will have been converted into functional components of "the case" and classified by component type and interrelated by way of the question.

The component type describes:

NOUN: NOUN

PER: PERSON NOUN

ADV: ADVERBIAL CONSTRUCTION

VERB: VERB

DO DIRECT OBJECT NOUN

ADJ: ADJECTIVE

Global Requirement Algorithm

This algorithm executes the described routine for each word identified in the scope and requires that the following list be uploaded into the database:

reqgl_abm_Sust: the sentence that will be used to compose the global requirement each time a NOUN component is identified in the scope. The method suggests something similar to: "Create, Read, Update and Delete"+{NounWord} reqgl_abm_Pers: the sentence that will be used to compose the global requirement each time a PER component is identified in the scope. The method suggests something similar to: "Create, Read, Update and Delete Entities with role"+{PersonWord} reqgl_verboF: the sentence that will be used to compose the global requirement each time a VERB linked to an F-type step is identified in the scope. The method suggests something similar to: "Create transaction record"+{VerbWord}+{DOWord} reqgl_verboF: the sentence that will be used to compose the global requirement each time a VERB linked to an L-type step is identified in the scope. The method suggests something similar to: "Create rule that"+{VerbWord}+{DOWord} "with"+{NounWord} reqgl_verbo: the sentence that will be used to compose the global requirement each time a VERB linked to a non-F- or non-L-type step is identified in the scope. The method suggests something similar to: "Create rule that"+{VerbWord}+{DOWord}

Once this algorithm is executed, all of the global requirements of "the case" are stored in the database.

Detailed Requirement Algorithm

This algorithm executes the described routine for each word identified in the scope and requires that the standard sentences in the language chosen for the description of the case be uploaded into the database:

Design Processing

The Design Processor takes the collection of functional components and the complements that were added in the analysis phase:
Attributes
Messages
Expressions
Associated Reqs All of which are linked to the functional components that are part of the scope of "the case".

The Design Processor Algorithm (FIG. 4G1), which implements Stage G. and automatically generates the classes and relationships that make up the resulting design diagram of "the case", is executed.

Document Processing

The tool is made up of permanent memories that are capable of automatically producing documents that are shown on a monitor, with fields in which the user can view the data that come from the upload memories.

Business Document Processing

The Business Document Generator takes the data uploaded in the Upload interface, which are stored in the Database, and applies the following algorithm to generate the Business document (FIG. 4I2):
 a) It takes the entirety of the stored uploaded data in the order indicated by the method accessing the database with the following columns and the number rows uploaded by the user: Layer, Resource, Process, Subprocess, Moment, Step, When, Who, What, How, Where, Sentence.
 b) It concatenates Layer&Resource&Process in the Title variable
 c) It concatenates Subprocess&Moment in the Subtitle variable
 d) It presents each step with a larger indentation
 e) It presents each sentence with a larger indentation It names the resulting document Business Document (FIG. 4I2) and the tool allows the user to store it in the Document File, print it using printing devices (printers, plotters, etc) and display it using display devices (monitors, screens, projectors, etc)

Analysis Document Processing

The Analysis Document Processor takes all of the Uploaded Data and generated Requirements, global as well as detailed, and applies the following algorithm to generate the Analysis document (FIG. 4I3):
 a) It uses the same algorithm as that of the Business document to generate Title, Subtitle and step
 b) It presents each Global Requirement associated with the step, with an indentation larger than that of the previous step
 c) It presents each Detailed Requirement associated with the Global Requirement, with an indentation larger than that of the previous Global Requirement.

It names the resulting document Analysis Document (FIG. 4I3) and the tool allows the user to store it in the Document File, print it using printing devices (printers, plotters, etc.) and display it using display devices (monitors, screens, projectors, etc.)

Design Document Processing

The Document Processor takes the data of the classes identified by the Design Processor and creates an XML file using the xmi standard for reading UML diagrams.

It names the resulting document Class Design Document (FIG. 5).

This resulting document is stored in the Document File

Database Memory

The tool is made up of permanent memories that are capable of storing the results produced by the tool:

Database

The database in which uploaded, analysis and design data produced by the tool are stored. It is managed by a database engine.

Document File

The database in which the generated documents are stored. It is a structure set up on a hard disk managed by the file server of the operating system.

The invention claimed is:

1. A computer-implemented method for generating functional-architecture documents from phrases expressed in natural language that describes a case, which are stored in a database memory, comprising:

A. uploading a logical structure named MAS metamodel through an input/output device, the MAS metamodel establishing axiomatic principles of the natural language and which determines the behavior of a processor that carries out the following functions depending on its configuration: automatic sentence analyzer, automatic software designer and document generator, according to morphosyntactic rules stored into the database memory, the MAS metamodel comprises the following sub-stages:
 A1. storing the MAS metamodel in the database memory, which defines a logic that the processor configured as an automatic sentence analyzer_will use to generate analysis and design documents, the logic includes an automatic generation of performer words, performable words and performance words, based on transitive verbs;
 A2. storing the logic of the MAS metamodel for morphosyntactic rules in the database memory, which establishes that every sentence in natural language can be structured based on a) questions logic: that define to what question of the form "when," "who," "what," "how" and "where," named as WH questions, a word within the simple sentence belongs, b) a step type logic: that defines what type of verb comprises the WH question (explicit calculation (FX), checking/confirmation (CC), query/search (QS), linking (L), not specified (F)) and c) a words logic: it defines the type of word;

B. inputting through a language user interface (of the input/output device) a list of eligible languages, a grammatical and syntactic features of each eligible language and storing this data in the database memory;

C. inputting through a case user interface (of the display device) to input a description of "the case" as text in one of the natural languages selected from the list of eligible languages from stage B and then storing said description in the database memory;

D. identifying simple sentences of the case from Stage C, responding for each sentence to the WH questions and using the case user interface (of the input/output device) to upload them so they can then be stored in the database memory;

E. identifying functional components on the simple sentences from stage d, through the processor configured as an automatic sentence analyzer, as is established in stage A, and storing them in the database memory;

F. automatically generating functional architecture documents based on functional components from Stage E, through the processor configured as a document generator, using a graphical notation defined specifically for this type of document, the generation of functional architecture comprises the following sub-stages:

F1. applying the morphosyntactic rules, based on which the processor configured as a document generator excludes from the functional components specific words stated, and creates new functional components in case of transitive verbs: a functional component, the name of which is a verb plus the agentive suffix "ER" and other functional component, the name of which is the verb plus the suffix "BLE;"

F2. defining the graphical notation that is to be used in functional architecture diagrams, using formats, graphical notation, and sentences user interface (STD) of the input/output device, indicating a graphical component to be used in the diagram for each functional component, according to a corresponding word type, and storing them in the database memory;

F3. generating the functional architecture documents using the processor, configured as a document generator, based on the functional components stored in the database memory, using the notation defined in substage F2, and displaying them on the input/output device.

2. The method in accordance with claim 1, characterized in that stage B consists of the following substages:

B1. entering through the input/output device an order of adjectives of the chosen eligible language and storing it in the database memory;

B2. entering through the input/output device special words of the chosen eligible language, which can be found on the text of the simple sentences from stage D and are to be excluded from the list of functional components, and storing them in the database memory;

B3. entering through the input/output device grouping words of the chosen eligible language, which are used to link functional components that contain more than one word and can be found in the text of the simple sentences from Stage D, and storing them in the database memory;

B4. entering through the input/output device verb endings of the infinitive verbs of the chosen eligible language, which can be found in the text of the simple sentences from stage D, and storing them in the database memory.

3. The method in accordance with claim 1, characterized in that stage C consists of the following substages:

C1. choosing the language in which the case is described, from the eligible languages defined in stage B, using the input/output device configured as a case user interface;

C3. identifying the steps of the case by applying the substage A2 and storing them in the database memory.

4. The method in accordance with claim 1, characterized in that stage C consists of identifying components that structure the context of "the case", layers, resources, processes, subprocesses and moments, and storing them in the database memory.

5. The method in accordance with claim 1, characterized in that stage D consists of the following substages:

D1. answering questions who, what, where, how and when for each of the steps of "the case" identified in stage B and storing the answers as text in a database memory;

D2. concatenating the text of the answers from each step into a simple sentence and storing said sentence as text in a database memory.

6. The method in accordance with claim 1, characterized in that stage E consists of deconstructing the simple sentences into words, characterizing them according to the chosen language, and identifying the functional components of the simple sentence and storing them in the database memory.

7. The method in accordance with claim 1, characterized in that, in Stage E, a user adds functional components that are not present in the list of functional components identified automatically from simple sentences.

8. The method in accordance with claim 1, characterized in that, in Stage E, the user adds formula expressions that describe mathematical behavior of "the case" for all CC- and FX-type steps.

9. The method in accordance with claim 1, characterized in that morphosyntactic rules defined in substage A1 are applied in stage E, based on which the processor configured as an automatic sentence analyzer excludes specific words stated in a rule and creates new functional components for the cases of transitive verbs: a functional component, the name of which is the verb plus the agentive suffix "ER" and a functional component, the name of which is the verb plus the suffix "BLE".

10. A computer-implemented method for generating software design specification documents from phrases expressed in natural language that describe a case, which are stored in a database memory, characterized by the following stages:

A. uploading through an input/output device a MAS metamodel into the database memory, the MAS metamodel establishes the axiomatic principles of natural language and determines the behavior of a processor, according to the morphosyntactic rules stored into the database memory, the MAS metamodel comprises the following sub-stages:

A1. storing the MAS metamodel in the database memory, which defines a logic that the processor will use to generate analysis and design documents; the logic includes an automatic generation of performer words, performable words and performance words, based on transitive verbs;

A2. storing the logic of the MAS metamodel for morphosyntactic rules in the database memory, which establishes that every sentence in natural language can be structured based on a) questions logic: that defines to what question of the form "when", "who", "what", "how", "where" named as a WH questions, a word within the simple sentence belongs, b) a step type logic: it defines what type of verb comprises the WH question (explicit calculation (FX), checking/confirmation (CC), query/search (QS), linking (L), not specified(F)) and c) a words logic: it defines the type of word;

B. entering through language user interface (of the input/output device) eligible languages, grammatical and syntactical features of each eligible language and storing those data in the database memory;

C. uploading through case user interface (of the display device) a description of "the case" as text in one natural languages selected from the list of eligible languages from stage B and then storing them in the database memory;

D. identifying simple sentences of the case that correspond to steps from stage C and using the case user interface (of the input/output device) to upload them so they can then be stored in the database memory;

E. automatically identifying functional components based on the simple sentences from stage D, through the processor configured as an automatic sentence analyzer and storing them in the database memory;

F. automatically generating functional architecture documents based on the functional components from stage E, through the processor configured as a document generator, using graphical notation defined specifically for this type of document;

G. automatically identifying design components based on the functional components from stage E, through the processor configured as an automatic software designer and storing them in the database memory;

H. uploading through the formats, graphical notations and STD sentences user interface (of the display device) the output formats of the business, analysis and design documents, the parameters of standard sentences for the requirements and the graphical notation for design diagrams and storing them in the database memory;

I. automatically generating business documents based on the simple sentences from stage D, the analysis documents based on the functional components from stage E, and the design documents based on the design components from stage F, through the processor configured as a document generator, applying the Formats, Graphical Notations and STD Sentences defined in stage G.

11. The method in accordance with claim 10, characterized in that stage G consists of the following substages:
G1. selecting and creating groups of functional components, their classes and inheritance relationships, and storing them in the database memory;
G2. creating formula classes based on FX- and CC-type steps and storing them in the database memory;
G3. creating domain classes based on QA-type steps and storing them in the database memory;
G4. creating relationship classes based on L-type steps and storing them in the database memory;
G5. creating operation classes based on F-type steps and storing them in the database memory.

12. The method in accordance with claim 10, characterized in that, in stage E, a user adds error, validation and warning messages.

13. The method in accordance with claim 10, characterized in that stage I consists of the following substages:
I1. generating business documents;
I2. generating analysis documents;
I3. generating software design documents.

14. The method in accordance with claim 13, characterized in that stage I1 generates the business documents through the following actions:
a) ordering dimensions, temporal activities and simple sentences;
b) joining previously ordered components; and
c) displaying the business documents on the input/output device.

15. The method in accordance with claim 13, characterized in that Stage I2 generates the analysis documents through the following actions:
a) assembling global functional requirements, defining global requirements for NOUN components and defining global requirements for VERB components;
b) assembling detailed functional requirements, defining detailed requirements for NOUN, PERSON, VERB and DO components; and
c) displaying the analysis documents on the input/output device.

16. The method in accordance with claim 13, characterized in that stage I3 generates the design documents and displays them on the input/output device.

17. The method in accordance with claim 10, characterized in that, in stage H, a user can use templates to compose the structure of the text of functional analysis documents of "the case", using the formats, graphical notation and STD sentences user interface of the input/output device, to then store them in the database memory.

18. The method in accordance with claim 10, characterized in that, in stage I, a user stores the design components of "the case" in extensible markup language (XML) format.

19. A system for generating functional architecture documents and business, analysis and software design specification documents from descriptions expressed in natural language phrases that describe a case, which are stored in a database, composed of the following:
an input/output device, configured as a language user interface, a case user interface, a formats, graphical notation and STD sentences user interface, and a document display user interface, to enter eligible languages and their structure, to enter a description of "the case" in natural language, to enter formats and graphical notations for document generation, and to display functional architecture documents and the business, analysis and software design specification documents;
a main memory connected to the input/output device, which interacts with a processor, configured for volatile storage of the description of the case, functional components, design components and the functional architecture documents and the business, analysis and software design specification documents;
the aforementioned processor configured to receive at least one description in natural language from the user, in which said description includes the case and identifies the description of the case;
the aforementioned processor, configured as an automatic sentence analyzer, for creating simple sentences that correspond to steps of the case and analyzing them to automatically generate functional components based on the simple sentences;

the aforementioned processor, configured as an automatic software designer, for identifying the design components of the case based on the functional components; and, the aforementioned processor, configured as a document generator, for generating functional architecture documents and business, analysis and software design specification documents based on the functional components and the design components;

a database memory connected to the processor, configured to statically store a MAS metamodel, languages, words and morphosyntactic rules and formats, graphical notation and STD sentences, and also configured to dynamically store simple sentences and questions, functional components and design components.

* * * * *